(12) United States Patent  
Nishino et al.

(10) Patent No.: US 8,323,812 B2
(45) Date of Patent: Dec. 4, 2012

(54) BATTERY PACK, BATTERY-MOUNTED DEVICE AND CONNECTION STRUCTURE FOR BATTERY PACK

(75) Inventors: Hajime Nishino, Nara (JP); Yasushi Hirakawa, Osaka (JP); Koshi Takamura, Osaka (JP)

(73) Assignee: Panasonic Corporation, Osaka (JP)

( * ) Notice: Subject to any disclaimer, the term of this patent is extended or adjusted under 35 U.S.C. 154(b) by 788 days.

(21) Appl. No.: 12/445,374

(22) PCT Filed: Oct. 12, 2007

(86) PCT No.: PCT/JP2007/069979
§ 371 (c)(1),
(2), (4) Date: Apr. 13, 2009

(87) PCT Pub. No.: WO2008/047721
PCT Pub. Date: Apr. 24, 2008

(65) Prior Publication Data
US 2010/0104928 A1    Apr. 29, 2010

(30) Foreign Application Priority Data

Oct. 13, 2006   (JP) ................................ 2006-280140

(51) Int. Cl.
*H01M 2/12* (2006.01)
(52) U.S. Cl. ........... 429/53; 429/163; 429/149; 429/148
(58) Field of Classification Search .................. 429/163, 429/149, 148, 53
See application file for complete search history.

(56) References Cited

U.S. PATENT DOCUMENTS 2,182,492 A    12/1939  Hall

FOREIGN PATENT DOCUMENTS

| EP | 0 305 822 A1 | 3/1989 |
|---|---|---|
| EP | 0 496 539 A1 | 7/1992 |
| JP | 63-143897 | 6/1988 |
| JP | 10-255736 | 9/1998 |
| JP | 2003-257494 | 9/2003 |
| JP | 2005-339932 A | 8/2005 |
| JP | 2005-322434 | 11/2005 |
| JP | 2005-339932 | 12/2005 |
| JP | 2006-236605 | 9/2006 |

OTHER PUBLICATIONS

Extended European Search Report, issued in European Patent Application No. EP 07 82 9715, dated Jul. 4, 2011.

*Primary Examiner* — Jane Rhee
(74) *Attorney, Agent, or Firm* — McDermott Will & Emery LLP

(57) ABSTRACT

It is aimed to provide a battery pack capable of securing safety by preventing A battery contained in the battery pack from entering a burning state even if the battery releases high-temperature gas in an abnormal state. An exhaust duct 1C for permitting the flow of gas released from the battery is provided and the gas is exhausted to the outside after reducing the temperature thereof in the exhaust duct 1C. A flow passage area of the exhaust duct 1C is in the range of not less than 0.5 mm$^2$ and not more than 15 mm$^2$ per 1 Ah of the battery capacity. The exhaust duct 1C is provided with a gas cooling portion 1L and a spark trapping portion 1M.

21 Claims, 13 Drawing Sheets

BATTERY PACK, BATTERY-MOUNTED DEVICE AND CONNECTION STRUCTURE FOR BATTERY PACK

RELATED APPLICATIONS

This application is the U.S. National Phase under 35 U.S.C. §371 of International Application No. PCT/JP2007/069979, filed on Oct. 12, 2007, which in turn claims the benefit of Japanese Application No. 2006-280140, filed on Oct. 13, 2006, the disclosures of which Applications are incorporated by reference herein.

FIELD OF THE INVENTION

The present invention relates to a battery pack capable of securing safety without giving off flame and smoke to the outside even if abnormality should occur to a battery.

BACKGROUND ART

In recent years, there has been a demand for batteries and battery packs with high capacity, high voltage and high output and high safety as electronic devices have been diversified. As means for providing particularly safe batteries and battery packs, a battery is generally provided with a PTC element or a temperature fuse for preventing an increase of a battery temperature and protection means for cutting off a current by sensing an internal pressure in the battery. Further, a safety circuit is installed in a battery pack to control the battery so as not to become defective.

However, even if the conventional protection means is provided, abnormality may occur in the battery and high-temperature and pressure gas may be blown from the inside of the battery. In such a case, it is thought that a casing of a pack containing the battery is broken, melted or burnt, whereby the high-temperature and pressure gas leaks to the outside of the battery pack or is burnt and spreads burning inside and outside the battery pack to increase damage.

As a method for preventing such a phenomenon, there has been proposed a method by which high-temperature pressure gas released from the battery is released to the outside of the casing after reducing the temperature and pressure of the gas and diffusing the gas in a casing in a battery module containing a plurality of batteries in the casing (patent literature 1) or a method by which a plurality of electric cells each having a safety valve for releasing gas when pressure in the cell increases to or above a specified value are connected into an electric cell group, a duct for exhausting the gas released from the electric cells to the outside is provided with an inflatable bag, pressure of the exhausted gas is decreased by the inflation of the bag in the case of generating a large quantity of gas, thereby releasing the gas to the outside without damaging the duct (patent literature 2).

However, since the gas released from the batteries has high temperature, high pressure and high inflammability, it may ignite upon being brought into contact with or mixed with oxygen in the air in some cases. Accordingly, in the case of using the means for reducing the temperature and pressure of the exhaust gas in a space as disclosed in patent literatures 1, 2, the gas is mixed with oxygen in the casing containing a plurality of batteries or in the exhaust duct, whereby the ignited gas comes to have higher temperature and pressure. Therefore, even other batteries start a runaway effect and the entire battery pack is broken, thereby increasing damage.

Patent Literature 1:
Japanese Unexamined Patent Publication No. 2005-322434
Patent Literature 2:
Japanese Unexamined Patent Publication No. 2005-339932

DISCLOSURE OF THE INVENTION

The present invention was developed for the purpose of solving the above shortcomings and an object thereof is to provide a battery pack capable of securing safety by preventing the battery pack from entering a burning state even if a battery contained in the battery pack releases high-temperature gas in an abnormal state.

In order to accomplish the above object, the present invention is directed to a battery pack containing a battery in a casing, comprising a path for permitting the flow of gas released from the battery and constructed to exhaust the gas to the outside after reducing the temperature of the gas in the path.

Since the temperature of the gas is reduced to such a temperature as not to lead to a burning state before the gas is exhausted to the outside in the present invention, the burning of the gas exhausted to the outside can be suppressed.

BEST MODES FOR EMBODYING THE INVENTION

Figure 1:
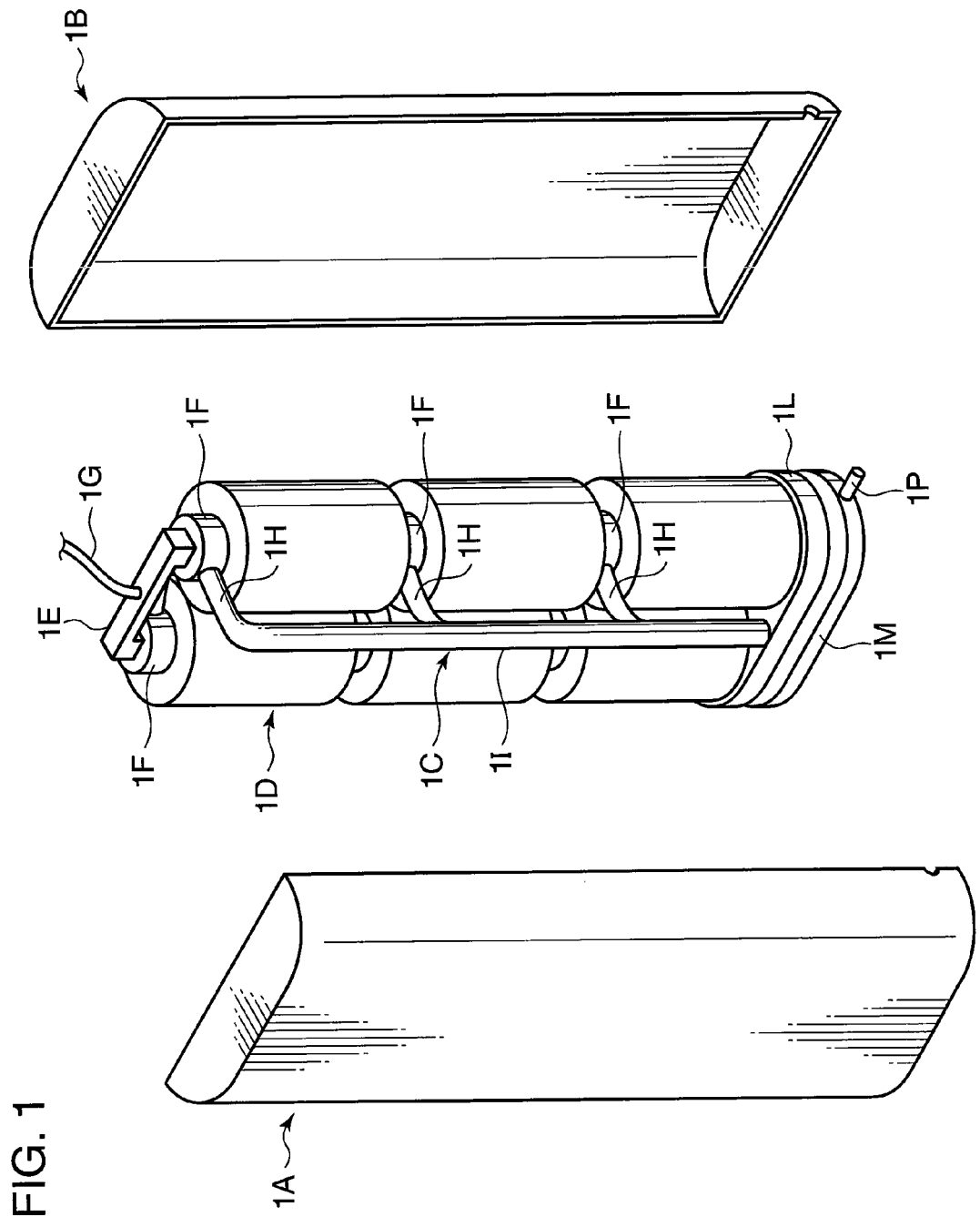
FIG. 1 is a perspective view showing the entire construction of a battery pack according to one embodiment of the invention.

Hereinafter, best modes for embodying the present invention are described in detail with reference to the drawings.

A battery pack according to one embodiment is the one in which a plurality of battery is arranged in a casing. The batteries may possibly release high-temperature gas at high speed in an abnormal state, but the battery pack has a path for exhausting the gas released from the batteries to the outside so that the gas is exhausted to the outside after the temperature thereof is reduced in the path.

In this battery pack, even if the battery in the battery pack generates heat due to an internal short circuit, overcharging or the like and high-temperature gas blows out from the interior of the battery, the gas is released to the outside of the battery pack after the temperature thereof is reduced. Thus, it is possible to suppress the burning of the gas and minimize damage. Normally, if the gas is released to the outside of the battery while having high temperature, the gas is mixed with oxygen outside the battery to be burnt. However, if the gas temperature is reduced before being mixed with oxygen as in the battery pack of this embodiment, the gas is not burnt even if being subsequently mixed with the air. In other words, that "the gas temperature is reduced" mentioned here means to reduce the gas temperature to such a temperature at which the gas is not burnt even if being mixed with air.

As means for suppressing the mixing of the gas with the air before the gas temperature is reduced, it is effective to form a gas path by providing a duct in the casing or to form a gas path by arranging partition plates in the casing. This aims to merge the flows of the exhaust gas into one and restrict the merged flow so as not to diffuse. Unless a gas flowing direction is restricted, the gas is non-directionally diffused in the casing, thereby being suitably mixed with oxygen in the casing to enter a burning state before the gas temperature is reduced. It is essential to ensure the sealability of the duct so that the released gas does not leak out of the duct. Further, it is effective to arrange the batteries so as not to excessively reduce clearances between the batteries and the diameter of the duct.

Metal such as aluminum, copper or titanium or noncombustible solid such as ceramic or sand can be used as a material for the partition plates and the duct. In the case of using no noncombustible solid, thermal damage of an exhaust path can be prevented by entirely or partially covering or forming a layer on the gas passing path using a noncombustible material such as a hydrated compound or an ionic liquid containing an imidazolium salt, a pyridinium salt or an aliphatic quaternary ammonium salt.

It can become more effective by providing heat exchange means or endothermic means for reducing the gas temperature in the gas passing path. The heat exchange means or endothermic means can be formed, for example, by a high thermally conductive material such as metal or a high specific heat material such as ceramic or by a material for absorbing heat as latent heat through melting or sublimation by heat such as solder, wax, low melting-point glass or water, or by a material for absorbing heat through decomposition such as magnesium carbonate or aluminum hydroxide. Further, the heat of the gas may be diffused to the other cells that are not ignited in the middle of the path. Furthermore, the heat exchange means or endothermic means may be formed by providing the duct with a fin.

Even if the temperature of the gas is reduced to such a temperature as not to spontaneously ignite, there is a possibility that the gas is ignited and burnt if sparks are included in the gas. Thus, it is necessary to remove sparks included in the gas before the gas is mixed with the air. If the gas passing path is formed to have a long duct structure as means for trapping the sparks included in the gas in the gas passing path, the trapping of the sparks can be realized. The gas passing path may be formed by a zigzag or spiral duct having bent portions and the bent portions may be realized by providing a plurality of projections in the gas path. It is also effective to provide the bent portions with pockets, into which sparks enter. However, it is necessary to consider the inner diameter of the duct and the angles and number of the bent portions so as not to hinder the exhaust of the gas. The dust is preferably made of copper, aluminum, stainless steel or like metal in consideration of heat releasing property and heat resistance. Besides the duct structure, the path may be simply provided with bent portions or the exhaust gas may be blown to a ceramic or metallic plate.

A flow passage area of the gas path is determined by capacity per cell of the battery arranged in the battery pack. In other words, since the quantity of the gas released from the battery is determined according to the capacity per cell of the battery, if the flow passage area of the gas path is determined by a ratio to battery capacity, the gas is permitted to flow in such a manner that a gas flow velocity does not fall to or below a specified value. This specified value of the gas flow velocity means such a gas flow velocity as to suppress the entrance of oxygen into the gas path and suppress the contact of the gas with oxygen. From such a perspective, the gas flow passage area is preferably in the range of not less than $0.5$ mm$^2$ and not more than 15 mm$^2$ per 1 Ah of the battery capacity. If the gas path is formed by a duct, the above flow passage area is that of the duct.

A gas cooling mechanism and a spark trapping mechanism may be provided in an aperture portion of the battery pack or in the respective batteries in the battery pack or in a device to have the batteries mounted therein, provided that they are paths in which the gas passes. In this case, the gas paths need to be able to release the gas to the outside of the device.

Next, one embodiment of the battery pack according to the present invention is described. The battery pack according to this embodiment is designed to contain assembled batteries 1D using six batteries by arranging each set of two cylindrical lithium ion secondary batteries of 18650 size in parallel and connecting three sets in series as shown in FIG. 1. A battery-mounted device according to one embodiment of the present invention is an electronic apparatus such as a portable personal computer or a video camera, a vehicle such as a four-wheel vehicle or a two-wheel vehicle or the like mounted with the battery pack shown in FIG. 1 and using it as a power source. If the battery-mounted device is a vehicle, the battery pack is used, for example, as a power source of wiring devices mounted in the vehicle or as a motive power source for an electric vehicle or a hybrid car.

The battery pack is provided with battery pack casings 1A and 1B, a battery pack terminal (not shown) for extracting electricity and an exhaust duct 1C. The casings 1A, 1B are made of polycarbonate, and the exhaust duct 1C is made of an iron sheet having a thickness of 0.3 mm. The exhaust duct 1C may be made of metal such as nickel, aluminum, titanium, copper or stainless steel, thermally-resistant resin such as liquid crystalline wholly aromatic polyester, polyethersulfone or aromatic polyamide, a laminated body of metal and resin, or the like.

A connecting plate 1E is welded to battery terminals 1F and battery bottoms of two batteries constituting one set. Accordingly, these two batteries are connected in parallel. This connecting plate 1E is electrically connected with the connecting plates 1E of the other sets via a connection lead 1G and also electrically connected with the battery pack terminal via the connection lead 1G. Although the connecting plate 1E of only the uppermost set is shown in FIG. 1, each of the other sets of batteries is similarly provided with a connecting plate 1E.

The exhaust duct 1C includes connection pipes 1H, main pipes 1I, a gas cooling portion 1L, a spark trapping portion 1M and an exhaust port 1P. The main pipe 1I is in the form of a straight pipe having a substantially constant horizontal cross-sectional area and arranged in parallel with a longitudinal direction of the batteries.

Figure 2:
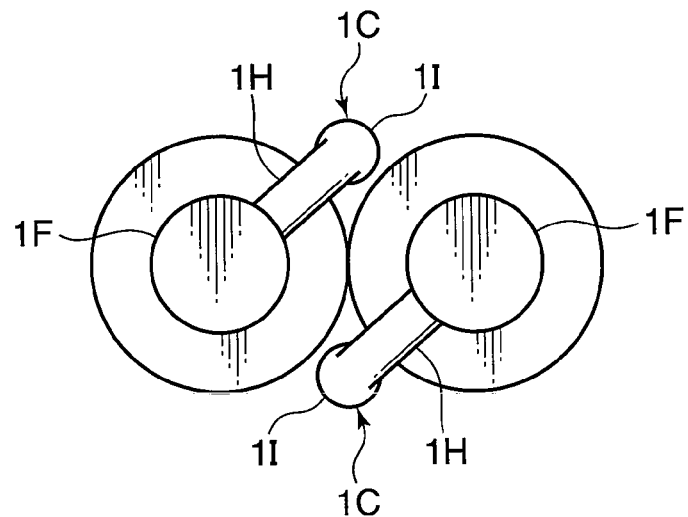
FIG. 2 is a diagram showing one set of batteries arranged at an uppermost level and an exhaust dust.

Since two batteries constitute each set in this embodiment, two main pipes 1I are accordingly provided. In other words, two batteries are arranged side by side in a width direction of the casings 1A and 1B, and three sets of batteries are arranged in the longitudinal direction in this state. Accordingly, each main pipe 1I is connected with three batteries adjacent to each other in the longitudinal direction of the casings 1A and 1B. As shown in FIG. 2, the respective main pipes 1I are arranged utilizing spaces formed between the two batteries of each set arranged side by side and the casings 1A and 1B. In this way, it is suppressed that the space in the casings 1A and 1B becomes larger. The main pipes 1I are not limited to straight pipes and may include bent portions in conformity with the arrangement relationship of the assembled batteries 1D.

The connection pipes 1H connect gas releasing portions of the batteries and the main pipes 1H. The connection pipes 1H are closely attached to the battery terminals 1F by highly heat resistance adhesive or the like so that gas exhausted from the gas releasing portions of the batteries are guided without leakage.

The battery terminals 1F and the connection pipes 1H can be made connectable and disconnectable by means of flange joints using O-rings, one-touch joints or hexagon cap nuts as shown in FIGS. 13 to 17. Specific constructions of FIGS. 13 to 17 are described in detail late The gas releasing portion is formed by an exhaust port formed in the battery terminal 1F to permit gas generated in the battery to escape to the outside of the battery. This gas releasing portion is normally closed, but is broken to release gas if gas of specified pressure or higher is generated in the battery in an abnormal state.

Each connection pipe 1H extends in the width direction of the battery from the battery terminal 1F and communicates with the main pipe 1I at an outer end thereof. Accordingly, the connection pipe 1H also functions as a bent portion bent with respect to the main pipe 1I.

Flow passage areas in the connection pipes 1H is set to be substantially equal to those in the main pipes 1I. These flow passage areas are set such that the flow velocity of gas released from the battery and flowing in the duct 1C does not fall to or below a specified level. Specifically, the capacity of the cylindrical lithium ion secondary batteries of 18650 size used in this embodiment is 2 Ah, and the flow passage areas in the connection pipes 1H and the main pipes 1I are not less than 5 mm$^2$ and not more than 20 mm$^2$.

The gas cooling portion 1L is connected with ends of the main pipes 1I opposite to the connection pipes 1H. The gas cooling portion 1L is connected with both main pipes 1I. Accordingly, gas flowing in both main pipes 1I flows into the gas cooling portion 1L. The gas cooling portion 1L is for cooling the gas flowing in the duct 1C before guiding the gas to the outside of the duct 1C. The gas cooling portion 1L is structured such that an endothermic agent made of a high thermal conductive material, a high specific heat material or the like is provided on the inner wall surface. The gas cooling portion 1L is, for example, formed to have a height of 3.6 mm and an inner space height of 3.0 mm.

Figure 3:
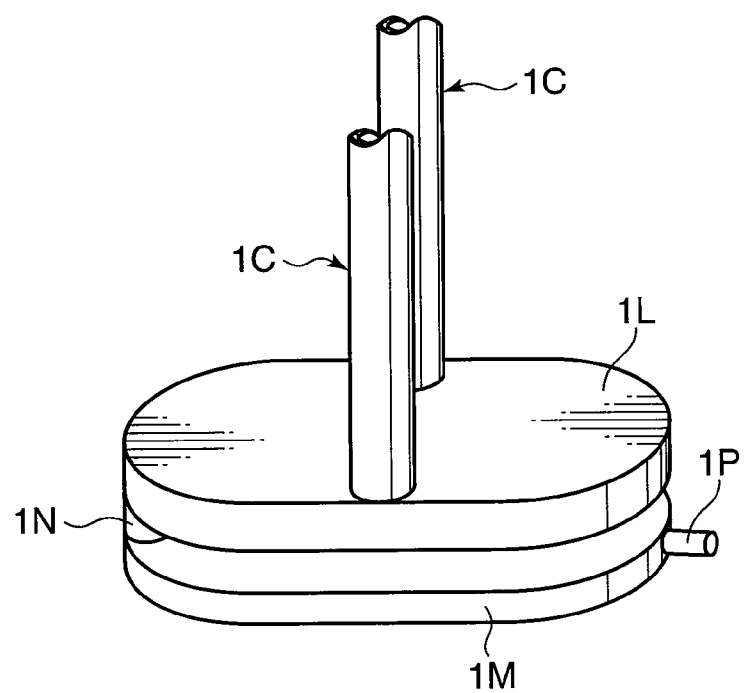
FIG. 3 is a perspective view enlargedly showing the vicinity of a gas cooling portion and a spark trapping portion.

The spark trapping portion 1M is arranged adjacent to the gas cooling portion 1L and communicates with the gas cooling portion 1L via a communication pipe 1N as shown in FIG. 3. The spark trapping portion 1M is provided to trap sparks in the gas, and a porous ceramic plate, gel sheet, copper mesh, aluminum mesh, SUS mesh, cement plate or gypsum plate is provided on the inner wall surface thereof. The exhaust port 1P is provided at the spark trapping portion 1M, so that gas having passed the spark trapping portion 1M is exhausted to the outside of the duct 1C via this exhaust port 1P. Accordingly, the gas released from the battery is guided from the connection pipe 1H to the main pipe 1I, passes the gas cooling portion 1L after passing the main pipe 1I and, thereafter, passes the spark trapping portion 1M to be released to the outside of the casing via the exhaust port 1P. The exhaust port 1P also functions as a connecting portion to be attached to and detached from an external path (not shown) provided in a battery-mounted device.

Although gas flows from the gas cooling portion 1L to the spark trapping portion 1M in this embodiment, it may flow from the spark trapping portion 1M to the gas cooling portion 1L. Further, the arrangement of the gas cooling portion 1L and the spark trapping portion 1M is not limited to the adjacent arrangement. Further, these may be integrally formed or may be provided in the connection pipes 1H or in the main pipes 1I.

Figure 4:
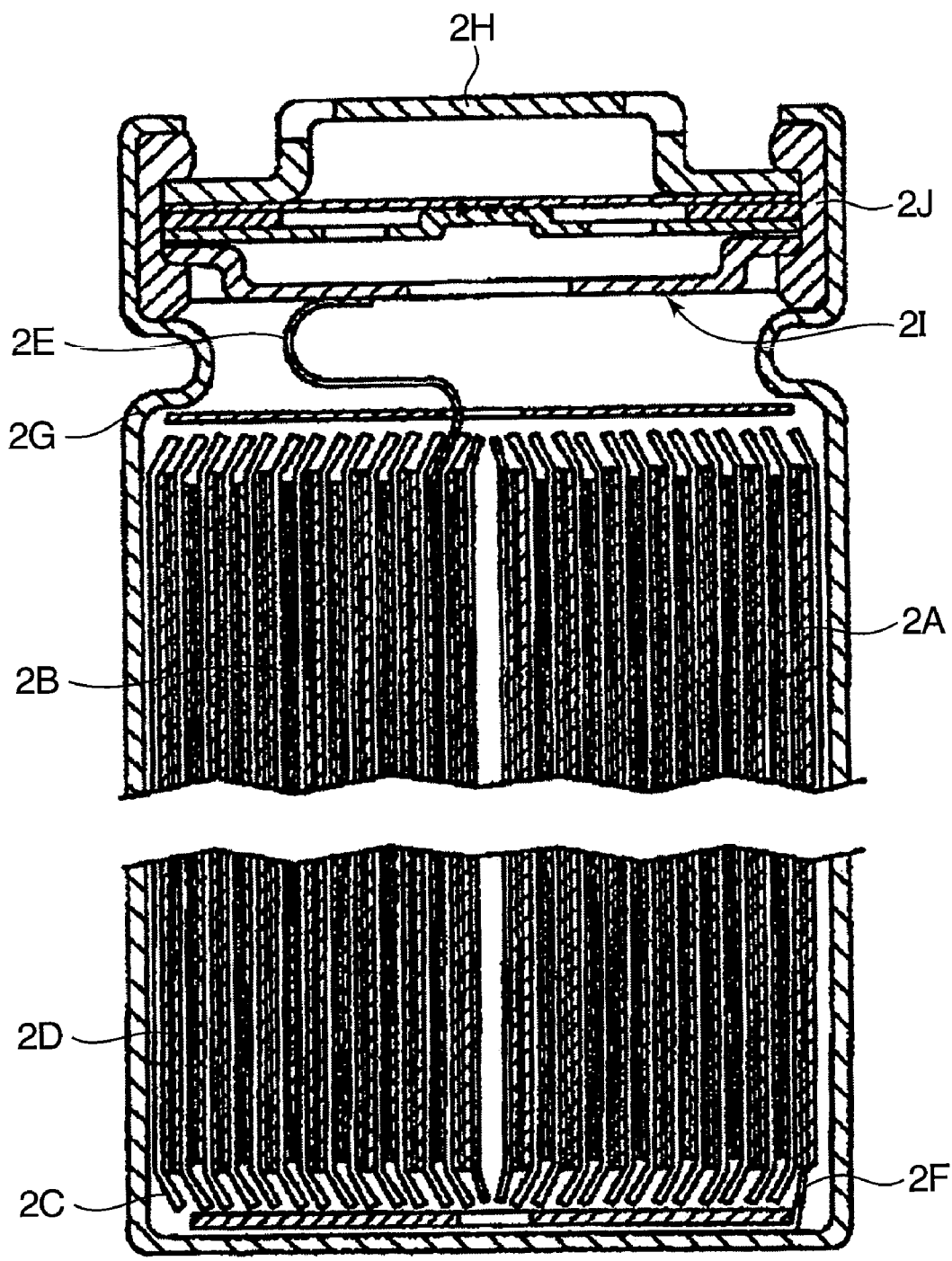
FIG. 4 is a section showing the construction of a battery.

FIG. 4 is a schematic vertical section of the battery according to the embodiment of the present invention. In FIG. 4, the cylindrical lithium ion battery includes a cylindrical electrode plate group 2D that is spirally wound. This electrode plate group 2D includes a positive electrode plate 2A obtained by applying a positive electrode mixture to an aluminum foil current collector, a negative electrode plate 2B obtained by applying a negative electrode mixture to a copper foil current collector and a separator 2C having a thickness of 25 µm and arranged between these two electrode plates.

A positive electrode lead current collector 2E is laser welded to the aluminum foil current collector. A negative electrode lead current collector 2F is resistance welded to the copper foil current collector. The electrode plate group 2D is contained in a metallic bottomed casing 2G. The negative electrode lead current collector 2F is resistance welded to a bottom part of the bottomed casing 2G to be electrically connected. The positive electrode lead current collector 2E is laser welded to a metallic filter 2I of a sealing plate 2H having an explosion-proof valve from an open end of the bottomed casing 2G to be electrically connected.

A nonaqueous electrolytic solution is poured from the open end of the bottomed casing 2G. A seat is formed by forming a groove in the open end of the bottom casing 2G, the positive electrode lead current collector 2E is bent, a resin outer gasket 2J and the sealing plate 2H are mounted on the seat of the bottom casing 2G, and the open end of the bottomed casing 2G is sealed over the entire circumference by caulking.

Figure 13:
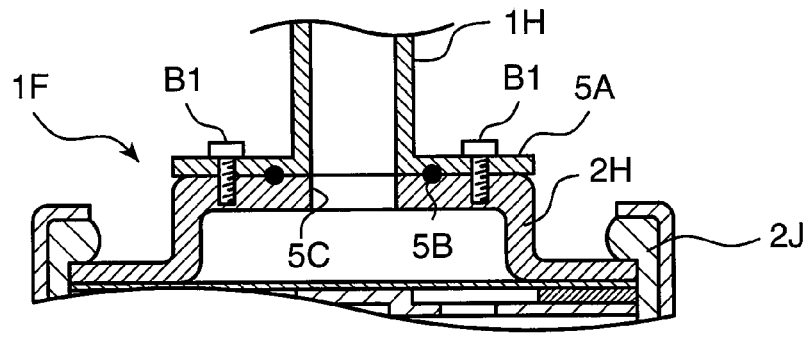
FIG. 13 is a section showing a joint part of a gas releasing portion and a duct.
Figure 14:
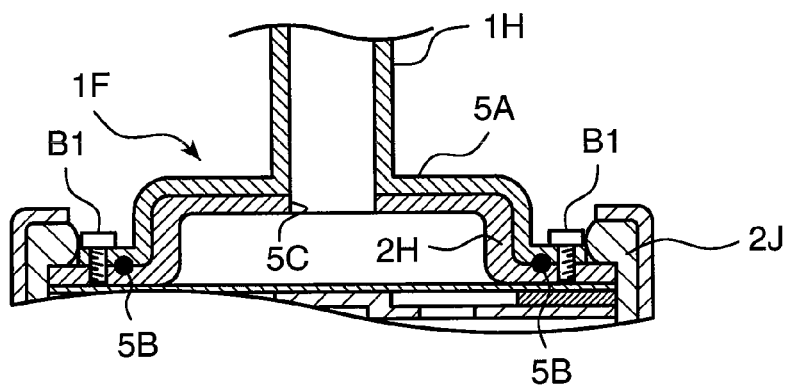
FIG. 14 is a section showing a joint part of a gas releasing portion and a duct.

Here, structures shown in FIGS. 13 to 17 for detachably connecting the connection pipe 1H and the battery terminal 1F are described. First of all, FIGS. 13 and 14 show constructions in which a flange portion 5A formed at an end of the connection pipe 1H is fixed to the sealing plate 2H by bolts B1, whereby the sealing plate 2H and the connection pipe 1H are connected while the interior of the sealing plate 2H and the interior of the connection pipe 1H communicate with each other via an opening 5C formed in the sealing plate 2H. An O-ring 5B is tightly held at a position inwardly of the bolts B1 between the flange portion 5A and the sealing plate 2H, and the flow of gas between the sealing plate 2H and the connection pipe 1H is hindered by this O-ring 5B.

Figure 15:
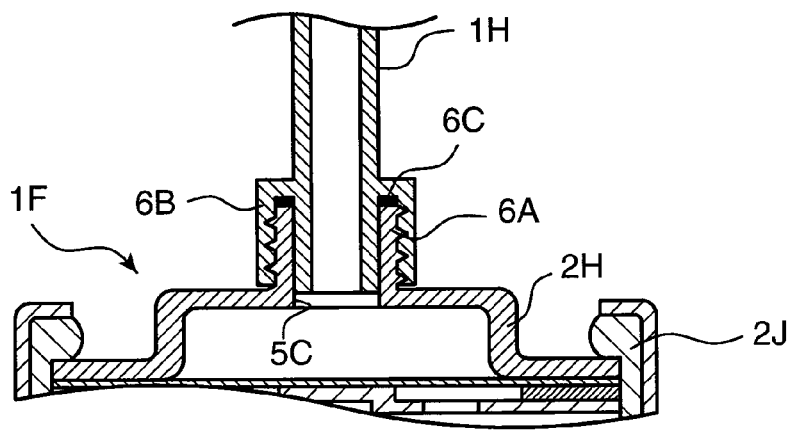
FIG. 15 is a section showing a joint part of a gas releasing portion and a duct.

FIG. 15 shows a construction in which the connection pipe 1H can be mounted on the battery terminal 1F by engaging an externally threaded portion 6A formed to project from the sealing plate 2H and an internally threaded portion 6B formed at an end of the connection pipe 1H with each other. In an engaged state of the respective threaded portions 6A, 6B, a packing 6C is tightly held between an end surface of the externally threaded portion 6A and the bottom surface of the internally threaded portion 6B and the flow of gas between the sealing plate 2H and the connection pipe 1H is hindered by this packing 6C.

Figure 16:
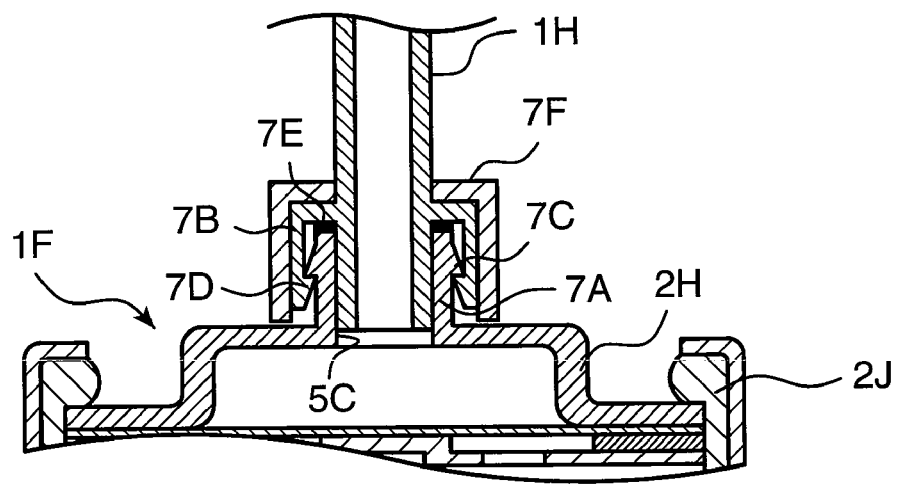
FIG. 16 is a section showing a joint part of a gas releasing portion and a duct.

FIG. 16 shows a construction in which an outer tube portion 7B formed at an end of the connection pipe 1H is fitted on an inner tube portion 7A formed to project from the sealing plate 2H, whereby claw portions 7C, 7D formed on these tube portions 7A, 7B are respectively engaged to retain the connection pipe 1H so as to prevent a detachment thereof from the sealing plate 2H. In this retained state, a packing 7E is tightly held between an end surface of the inner tube portion 7A and a bottom surface of the outer tube portion 7B and the flow of gas between the sealing plate 2H and the connection pipe 1H is hindered by this packing 7E. The engagement of the respective claw portions 7C, 7D can be realized through an outward elastic deformation of the outer tube portion 7B. In such a case, a constraining tube 7F for holding the both claw portions 7C, 7D engaged by preventing the elastic deformation of the outer tube portion 7B is preferably provided at an outer side of the outer tube portion 7B.

Figure 17:
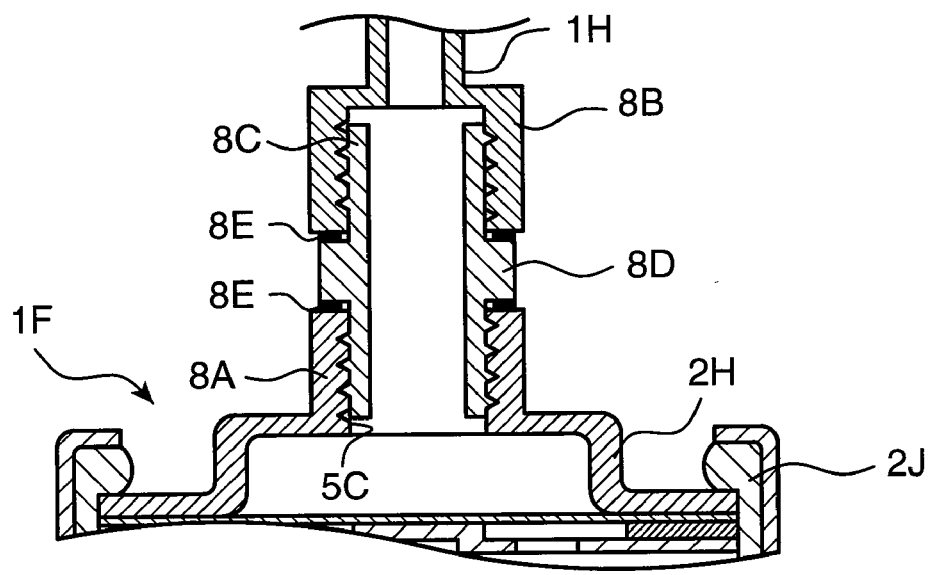
FIG. 17 is a section showing a joint part of a gas releasing portion and a duct.

FIG. 17 shows a construction in which the connection pipe 1H and the sealing plate 2H are connected by engaging the opposite ends of a sleeve 8C with an internally threaded portion 8A formed to project from the sealing plate 2H and an internally threaded portion 8B formed in an end of the connection pipe 1H. In this connected state, a packing 8E is tightly held between a large-diameter portion 8D formed at a longitudinal intermediate part of the sleeve 8C and end surfaces of the respective internally threaded portions 8A, 8B and the flow of gas between the sealing plate 2H and the connection pipe 1H is hindered by this packing 8E.

Next, as shown in FIG. 1, completed six cylindrical lithium ion secondary batteries were arrayed and connected in series by the connecting plates 1E made of nickel and having a thickness of 0.2 mm, and the connection leads 1G for electrical connection with the battery pack terminal constituting the battery pack were attached to the connecting plates 1E to manufacture the assembled batteries 1D.

Figure 5:
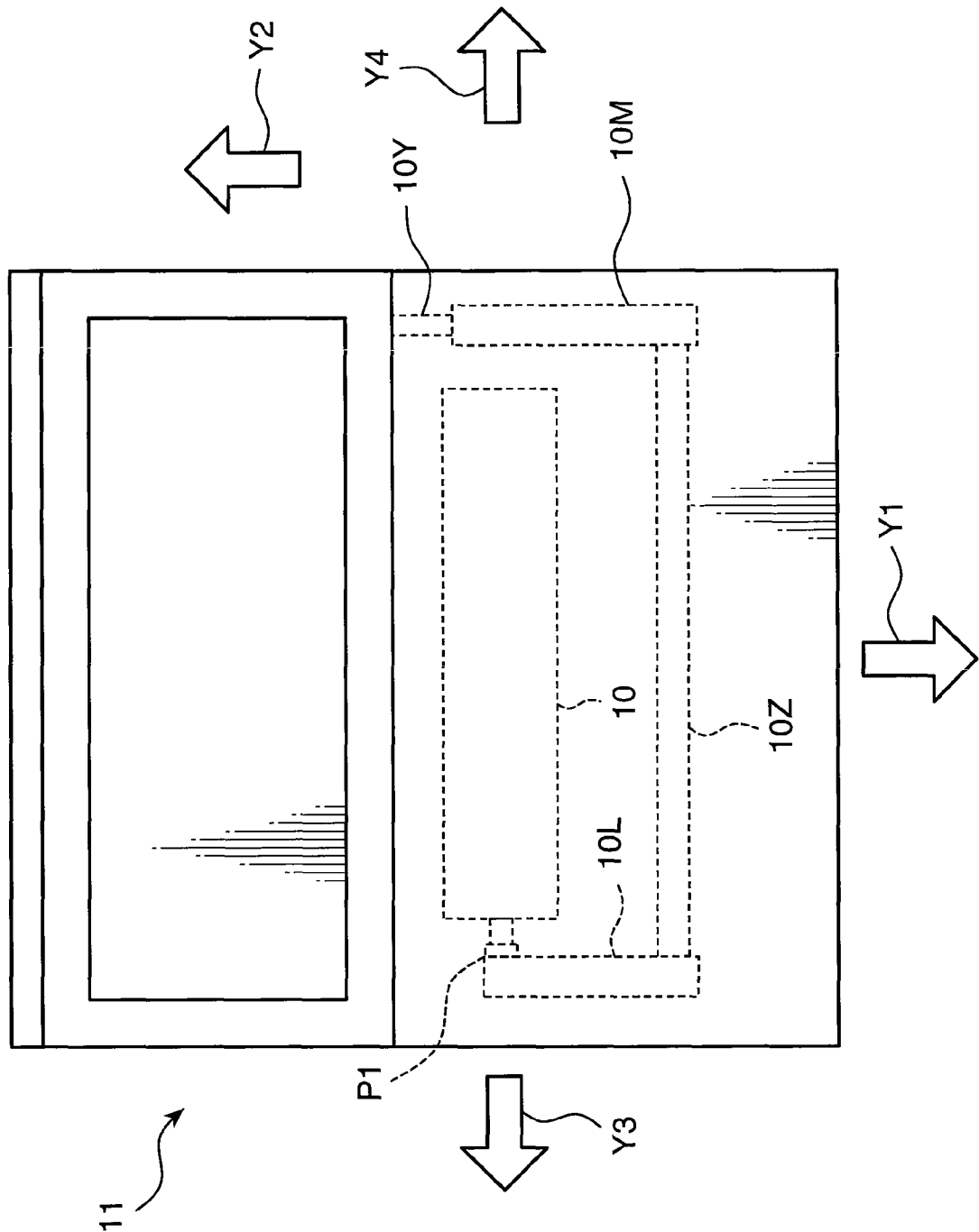
FIG. 5 is a diagram showing the construction of a note PC as a battery mounted device.
Figure 6:
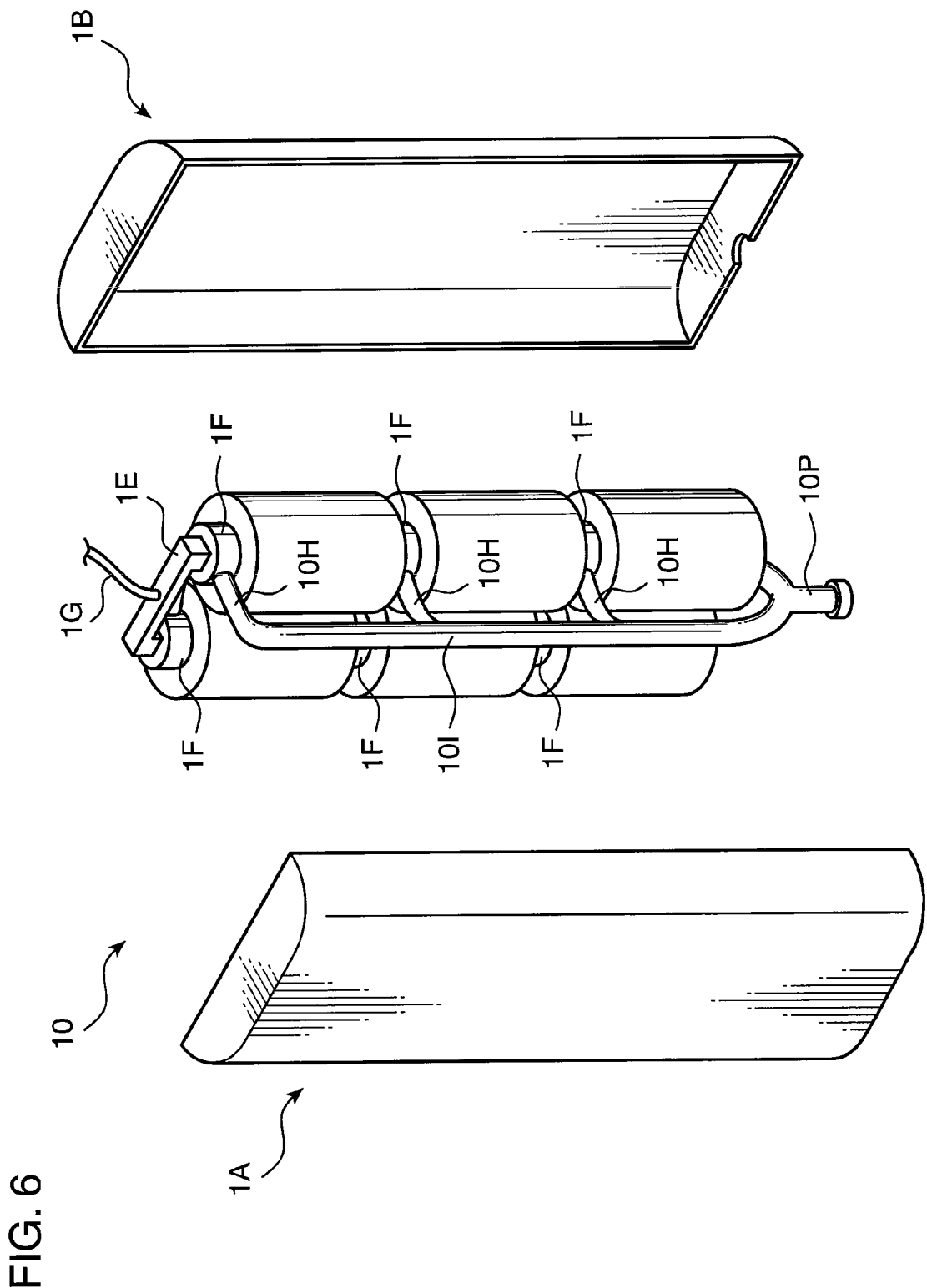
FIG. 6 is an exploded perspective view showing the construction of a battery pack mounted in the note PC of FIG. 5.

Next, a first embodiment of a battery-mounted device according to the present invention is described. This first embodiment is a notebook personal computer (hereinafter, "note PC") mounted with a battery pack 10 using six batteries by arranging each set of two cylindrical lithium ion secondary batteries of 18650 size in parallel and connecting three sets in series as shown in FIGS. 5 and 6.

The battery pack 10 of the first embodiment is provided with connection pipes 10H, main pipes 10I and a connecting portion 10P as an exhaust duct unlike the battery pack of the above embodiment. In other words, a gas cooling portion 10L, a communication path 10Z, a spark trapping portion 10M and an exhaust port 10Y are mounted in the battery-mounted device, i.e. in a main body of the note PC as an external path.

Specifically, by mounting the battery pack 10 in the note PC 11, the exhaust duct (connecting portion 10P) of the battery pack 10 and the external path (gas cooling portion 10L) are joined at a joint position P1. Gas generated in an abnormal state is fed from the connection portion 10P of the battery pack 10 to the note PC 11 via the joint position P1 and is released from a side surface of the note PC 11 opposite to the one facing a user by successively passing the gas cooling portion 10L, the communication path 10Z, the spark trapping portion 10M and the exhaust port 10Y in this order. In other words, in the note PC of this embodiment, the gas is exhausted in a direction Y2 opposite to a direction Y1 from the note PC 11 toward the user.

Facing directions of the exhaust ports 1P, 10P are not limited to the direction Y2 opposite to the direction Y1 toward the user and are sufficient to be at least different from the direction Y1. For example, these facing directions may be directions Y3, Y4 orthogonal to the direction toward the user.

From a standpoint of protecting human bodies to suppress influence on human bodies to a minimum level in terms of safety upon the occurrence of an abnormal situation in the battery pack, there is a high possibility that the user of the apparatus mounted with the battery pack is closest to the apparatus. In other words, it has a high possibility of minimizing human damage to set a facing direction of the exhaust port to a direction different from the one toward the user.

The gas having passed in the above path and exhausted from the exhaust port is released into the air, whereby the temperature thereof further decreases. Thus, sufficient safety can be thought to be secured unless the gas is directly blown to a person closest to the battery pack-mounted device.

Figure 7:
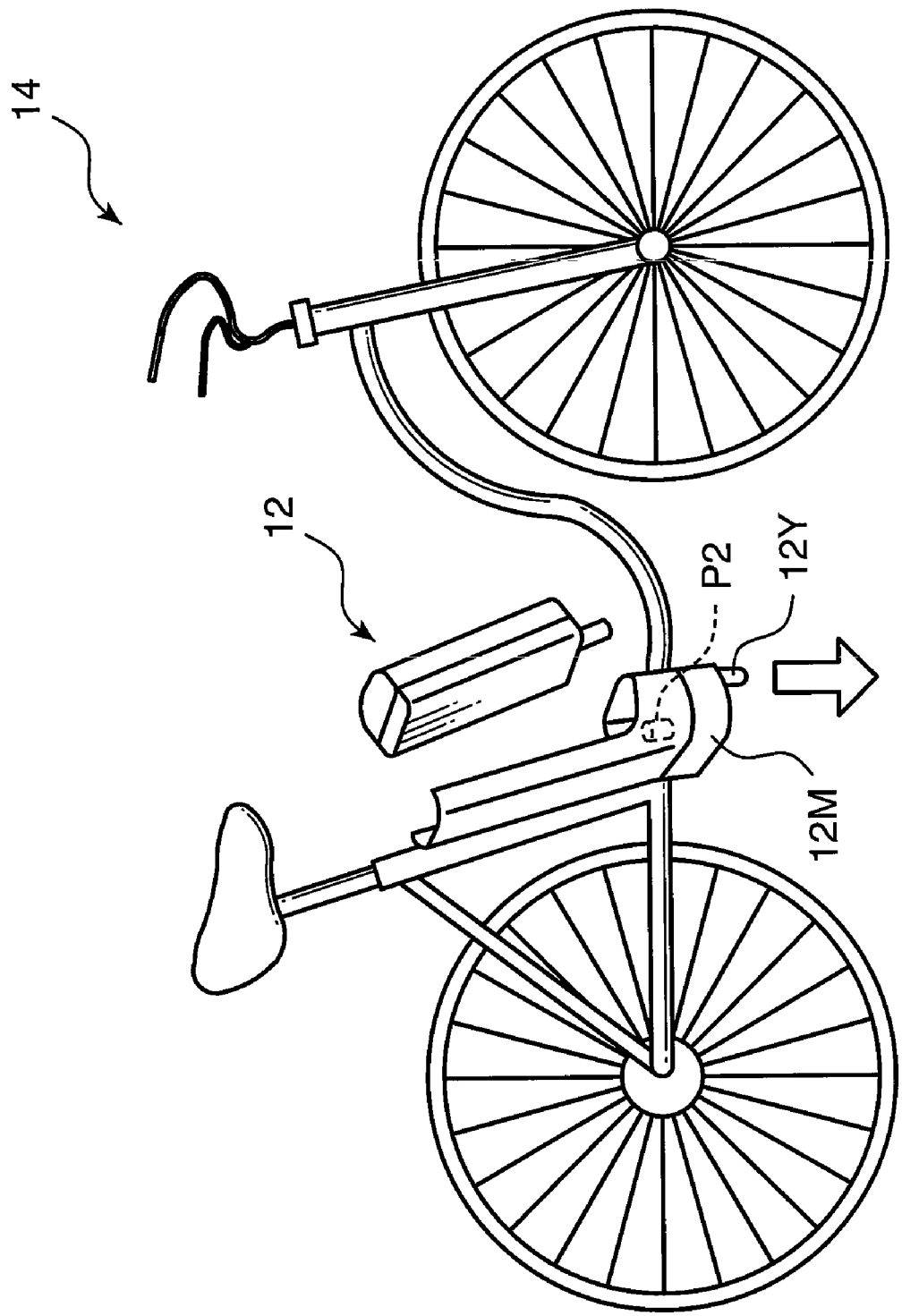
FIG. 7 is a diagram showing the construction of an electric bicycle as a battery mounted device.
Figure 8:
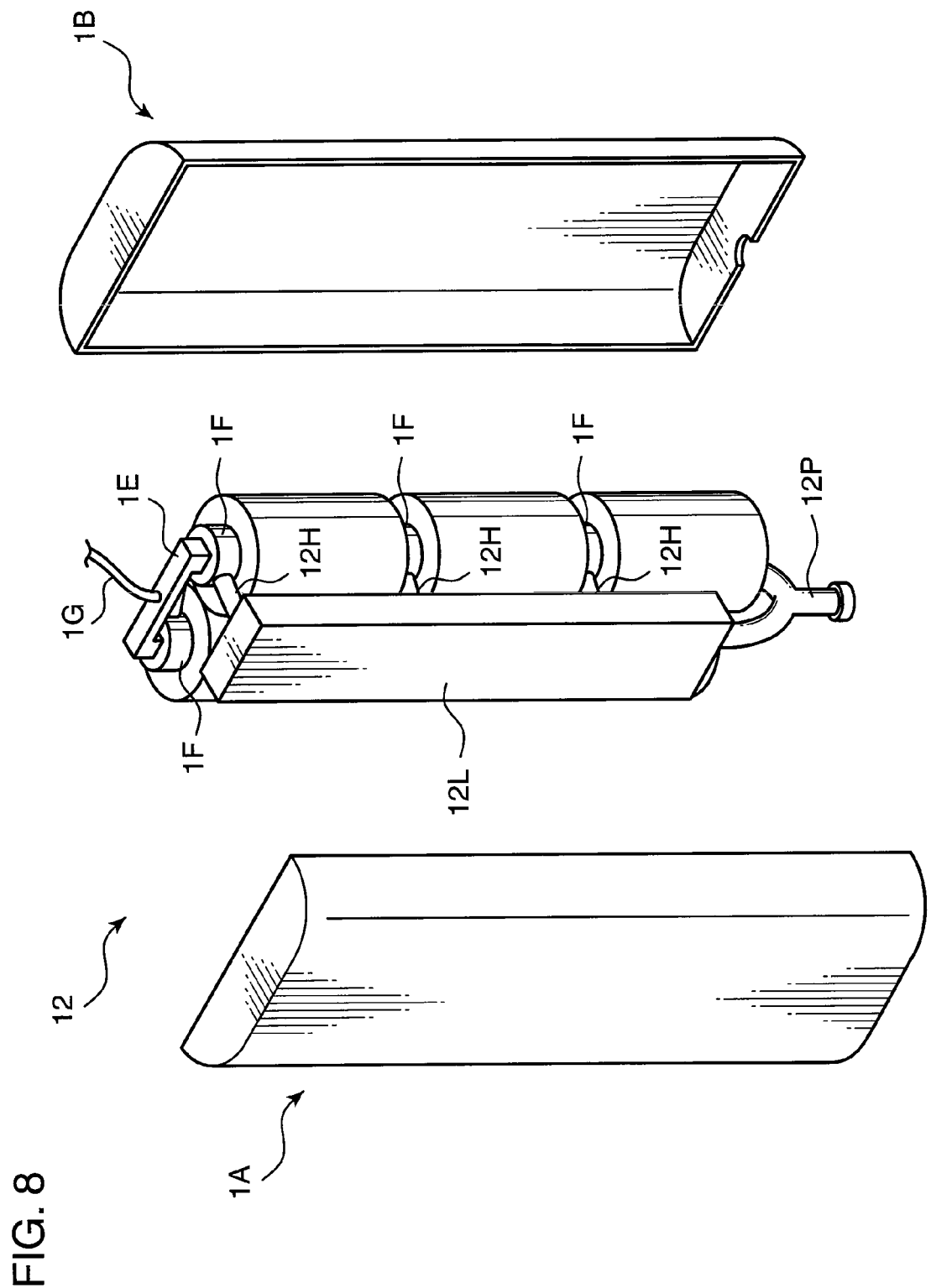
FIG. 8 is an exploded perspective view showing the construction of a battery pack mounted in the electric bicycle of FIG. 7.
Figure 9:
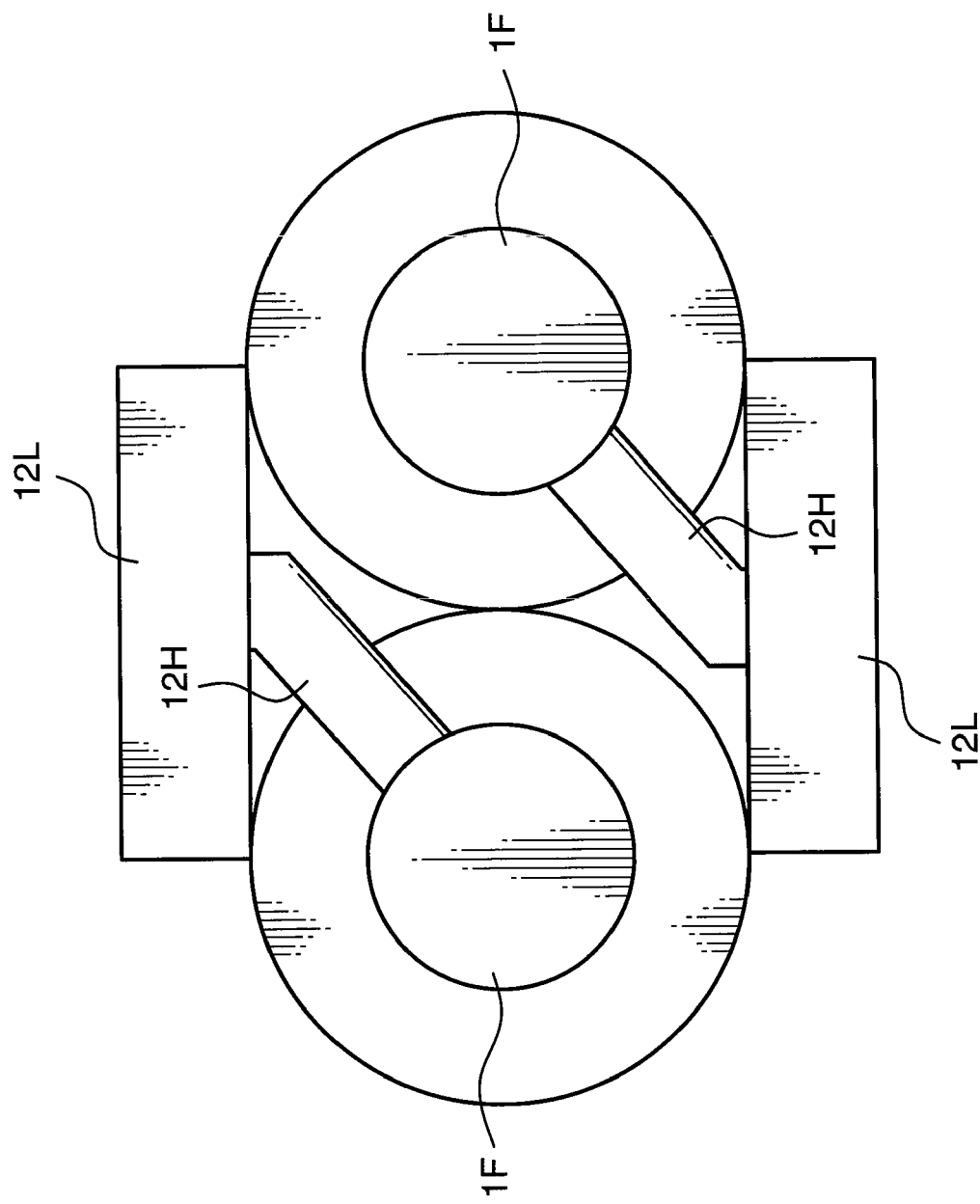
FIG. 9 is a plan view of assembled batteries of the battery pack of FIG. 8.

Next, a second embodiment of the battery-mounted device according to the present invention is described. The second embodiment concerns a power assisted electric bicycle 14 as a battery-mounted device mounted with a battery pack 12 using six batteries by arranging each set of two cylindrical lithium ion secondary batteries of 18650 size having a diameter of 32 mm and a height of 120 mm in parallel and connecting three sets in series as shown in FIGS. 7 to 9.

The battery pack 12 in the second embodiment includes connection pipes 12H, a gas cooling portion 12L and a connecting portion 12P as an exhaust duct unlike the battery packs of the above respective embodiments. In other words, a spark trapping portion 12M and an exhaust port 12Y are mounted in the battery-mounted device, i.e. in a main body of the electric bicycle 14 as an external path.

Specifically, by mounting the battery pack 12 in the electric bicycle 14, the exhaust duct (connecting portion 12P) of the battery pack 12 and the external path (gas cooling portion 12L) are joined at a joint position P2. Gas generated in an abnormal state is released to a bottom side (lower side) of the electric bicycle 14 opposite to a surface (upper side) at a cyclist side of the electric bicycle 14 by way of the gas cooling portion 12L and the joint position P2 of the battery pack 12.

Figure 10:
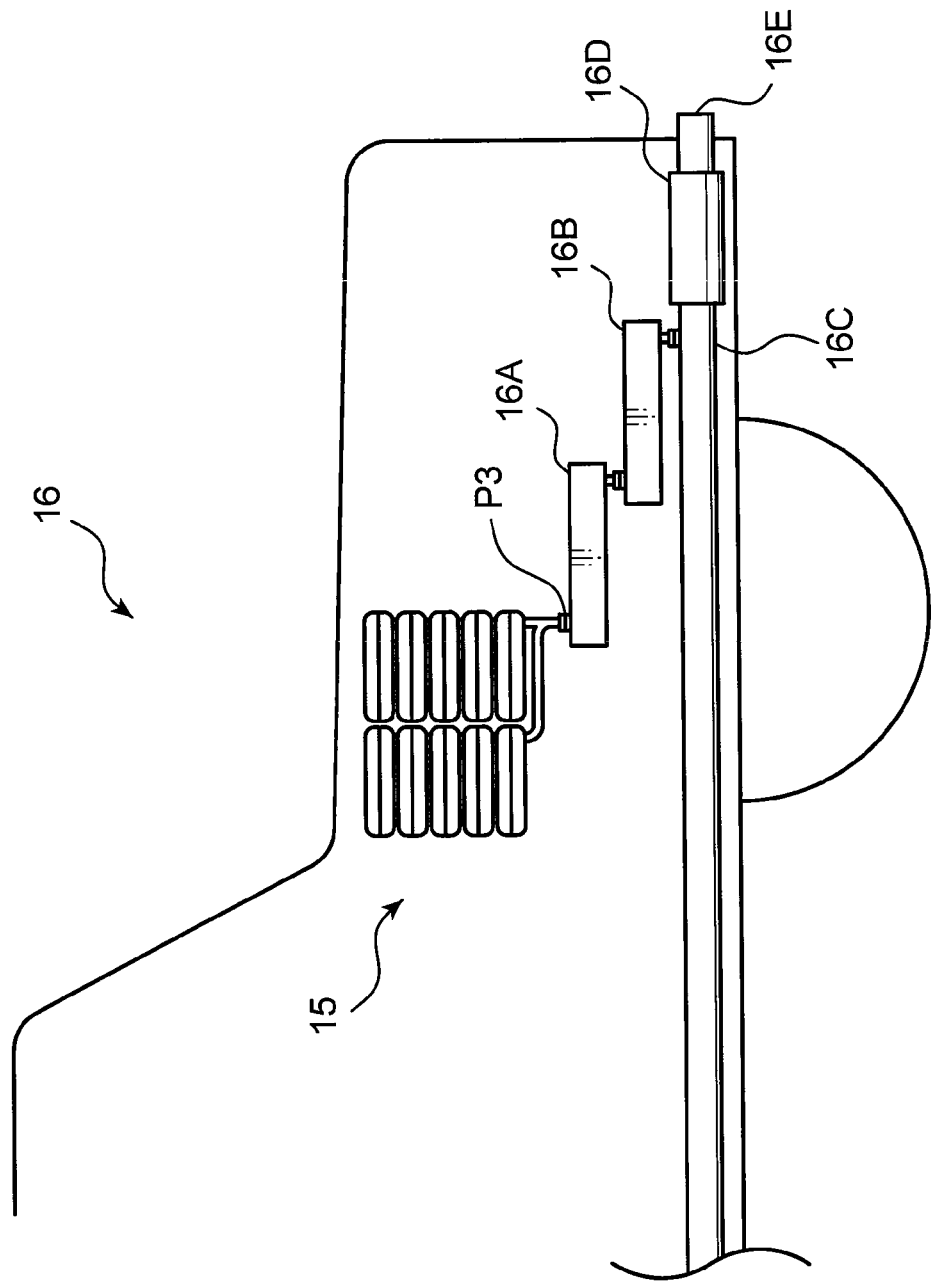
FIG. 10 is a schematic side view enlargedly showing a partial construction of a hybrid electric vehicle as a battery mounted device.
Figure 11:
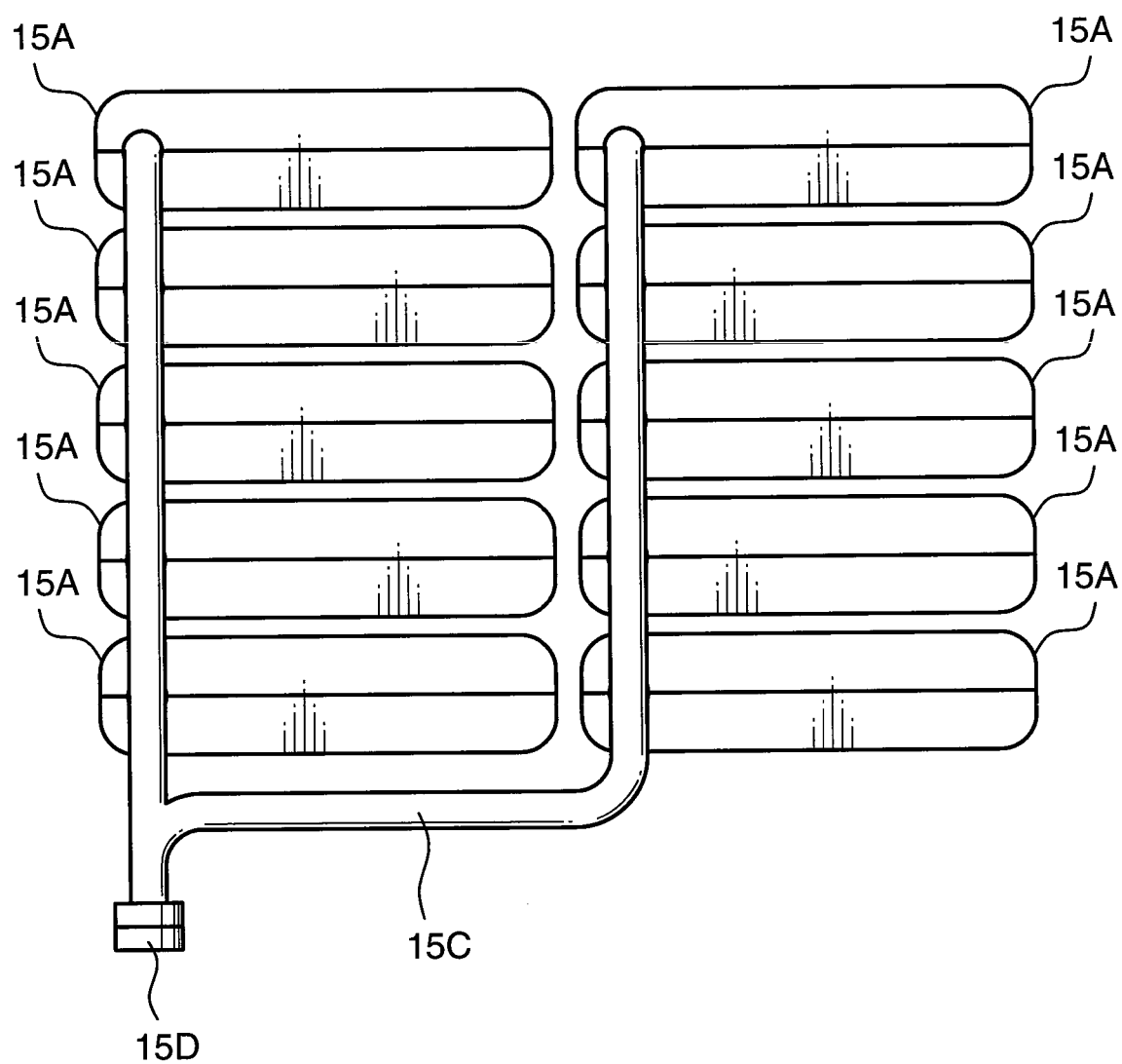
FIG. 11 is a front view showing the construction of a battery pack mounted in the electric vehicle of FIG. 11.
Figure 12:
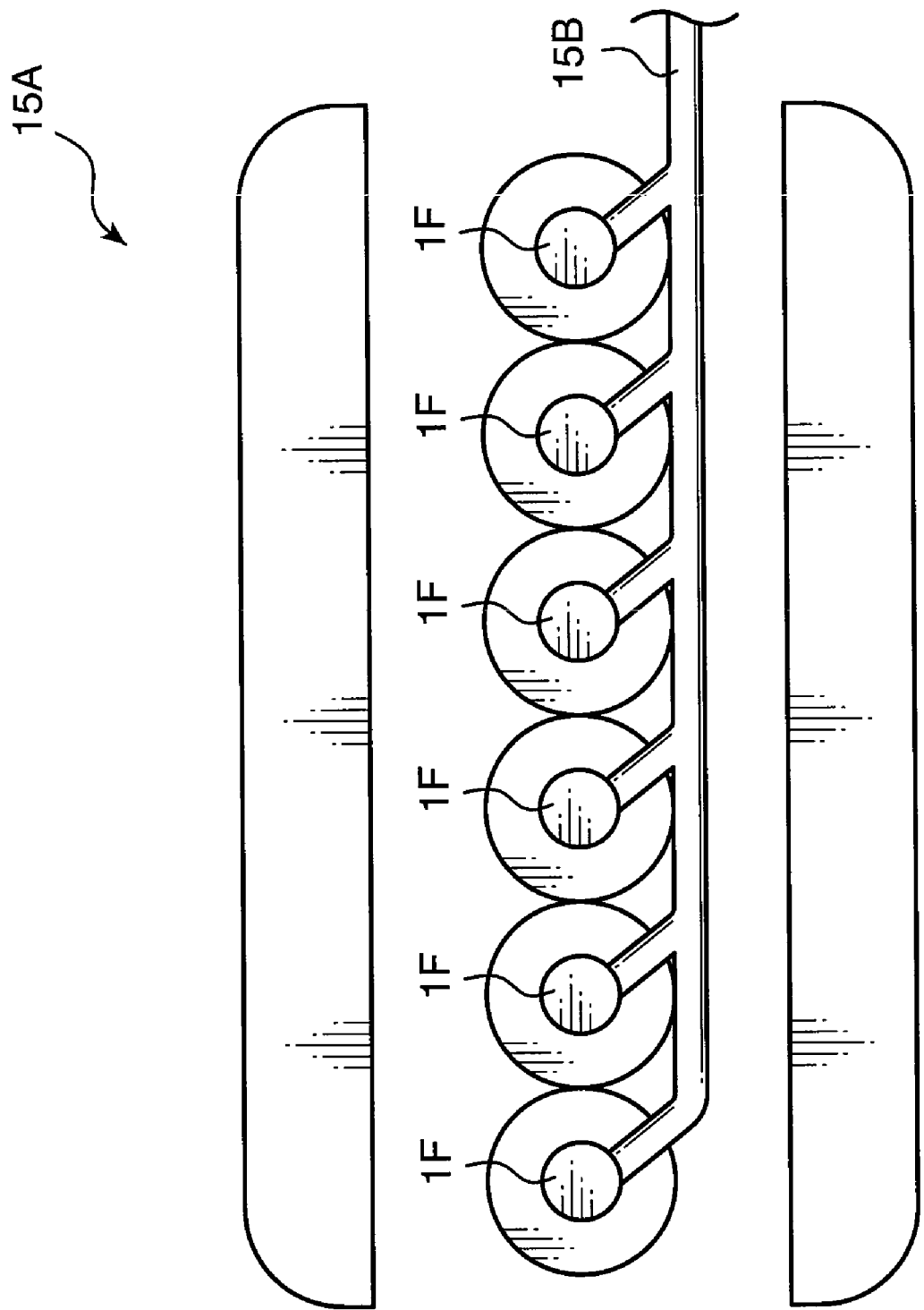
FIG. 12 is an exploded diagram of a pack body of the battery pack of FIG. 11.

Next, a third embodiment of the battery-mounted device according to the present invention is described. The third embodiment concerns a hybrid type electric car 16 mounted with a battery pack 15 using sixty batteries by arranging each set of six cylindrical lithium ion secondary batteries of 18650 size having a diameter of 32 mm and a height of 120 mm in parallel by series wiring and connecting ten sets in series as shown in FIGS. 10 to 12.

The battery pack 15 includes ten pack bodies 15A each containing six batteries, outlet pipes 15B provided in the pack bodies 15A and capable of leading gas exhausted from the respective batteries in the respective pack bodies to the outside of the pack bodies 15A, a collecting pipe 15C for joining these outlet pipes 15A and a connecting portion 15D provided in this collecting pipe 15C.

The electric car 16 is provided with a gas cooling portion 16A connectable with the connecting portion 15D, a spark trapping portion 16B connected with the gas cooling portion 16A, an exhaust pipe 16C for exhausting gas led from the battery pack 15 to the outside of the car together with engine exhaust gas, a muffler 16D provided at an intermediate position of this exhaust pipe 16C and an exhaust port 16E for exhausting the gas at a side downstream of this muffler 16D.

In other words, the battery pack 15 of this embodiment is provided with the outlet pipes 15B, the collecting pipe 15C and the connecting portion 15D as an exhaust duct, whereas the electric car 16 is provided with the gas cooling portion 16A, the spark trapping portion 16B, the exhaust pipe 16C and the exhaust port 16E as an external path.

In this embodiment, by mounting the battery pack 15 in the electric car 16, the exhaust duct (connecting portion 15D) of the battery pack 15 and the external path (gas cooling portion 16A) of the electric car 16 are joined at a joint portion P3, and gas generated in an abnormal state is released from the battery pack 15 to a side (rear side) opposite to a passenger side (front side) of the car by way of the joint portion P3, the gas cooling portion 16A, the spark trapping portion 16B, the exhaust pipe 16C and the exhaust port 16E.

EXAMPLES

Examples of the battery pack are described below.

(1) Manufacturing of Positive Electrode Plate

The positive electrode plate 2A is manufactured as follows. 85 weight parts of lithium cobaltate powder as a positive electrode mixture, 10 weight parts of carbon powder as an electrically conductive agent and 5 weight parts of poly vinylidene fluoride (hereinafter, "PVDF") in a N-methyl-2-pyrrolidone (hereinafter, "NMP") solution of PVDF as a binder were mixed. After this mixture was applied to an aluminum foil current collector having a thickness of 15 μm and dried, the aluminum foil current collector is rolled. In this way, the positive electrode plate 2A having a thickness of 100 μm was manufactured.

(2) Manufacturing of Negative Electrode Plate

The negative electrode plate 2B is manufactured as follows. 95 weight parts of artificial graphite powder as a negative electrode mixture and 5 weight parts of PVDV in an NMP solution of PVDF as a binder were mixed. After this mixture was applied to a copper foil current collector having a thickness of 10 μm and dried, the copper foil current collector is rolled. In this way, the negative electrode plate 2B having a thickness of 110 μm was manufactured.

(3) Adjustment of Nonaqueous Electrolytic Solution

The nonaqueous electrolytic solution is prepared as follows. Ethylene carbonate and ethylene methyl carbonate as nonaqueous solvents were mixed at a volume ratio of 1:1 and lithium hexafluorophosphate ($LiPF_6$) as a solute was dissolved into this mixture to have a concentration of 1 mol/L. 4.5 ml of the nonaqueous electrolytic solution thus prepared is used.

(4) Manufacturing of Sealed Secondary Battery

After the tubular electrode plate group 2D was formed by winding the positive electrode plate 2A and the negative electrode plate 2B with the separator 2C having a thickness of 25 μn arranged therebetween, it was inserted into the metallic bottomed casing 2G and sealed. In this way, the sealed nonaqueous electrolytic secondary battery was obtained. This battery was a cylindrical battery having a diameter of 18 mm and a height of 65 mm and a design capacity thereof was 2000 mAh. The completed battery was covered with a heat shrinkable tube having a thickness of 80 μm and made of polyethylene terephthalate up to the outer edge of the top surface as a battery can insulator, and the heat shrinkable tube was thermally shrunk with hot air of 90° C. to complete the battery.

(5) Manufacturing of Battery Pack

Example 1A

The assembled batteries 1D and the exhaust duct 1C shown in FIG. 1 were contained in the battery pack 1A, 1B and the outer peripheries of the battery pack 1A, 1B were welded. At this time, the completed battery pack was charged with constant current, constant voltage up to 13.5 V by bypassing an overcharge protection circuit and a current interrupt device (CID) of the cells of the pack normally charged up to 12.6 V with a maximum current at the time of charging set to 3 A and a current at the end of charging set to 0.1 A, whereby a battery pack of Example 1 was obtained.

Example 1B

A porous ceramic plate (industrial ceramic honeycomb: manufactured by NGK Insulators, Ltd.) having a thickness of 1 mm was bonded to the inner part of the spark trapping portion 1M. An arrangement position of this porous ceramic plate was on a wail facing a wall portion connected with the communication pipe 1N. A battery pack was manufactured similar to Example 1A except for the above to obtain a battery pack of Example 1B.

Example 1C

A gel plate (manufactured by Sekisui Plastics Co., Ltd.) having a thickness of 1 mm was bonded to the inner part of the spark trapping portion 1M. An arrangement position of this gel plate was on the wall facing the wall portion connected with the communication pipe 1N. A battery pack was manufactured similar to Example 1A except for the above to obtain battery pack of Example 1C.

Example 1D

Copper meshes (wire diameter of 40 μm, opening of 45×45 μm) were placed one over another to have a thickness of 1 mm and bonded to the inner part of the spark trapping portion 1M. An arrangement position of these copper meshes was on the wall facing the wall portion connected with the communication pipe 1N. A battery pack was manufactured similar to Example 1A except for the above to obtain a battery pack of Example 1D.

Example 1E

Aluminum meshes (wire diameter of 40 μM, opening of 45×45 μm) were placed one over another to have a thickness of 1 mm and bonded to the inner part of the spark trapping portion 1M. An arrangement position of these aluminum meshes was on the wall facing the wall portion connected with the communication pipe 1N. A battery pack was manufactured similar to Example 1D except for the above to obtain a battery pack of Example 1E.

Example 1F

SUS316 meshes (wire diameter of 40 μm, opening of 45×45 μm) were placed one over another to have a thickness of 1 mm and bonded to the inner part of the spark trapping portion 1M. An arrangement position of these SUS316 meshes was on the wall facing the wall portion connected with the communication pipe 1N. A battery pack was manufactured similar to Example 1D except for the above to obtain a battery pack of Example 1F.

Example 1M

A cement plate having a thickness of 1 mm was formed and bonded to the inner part of the spark trapping portion 1M. An arrangement position of the cement plate was on the wall facing the wall portion connected with the communication pipe 1N. A battery pack was manufactured similar to Example 1A except for the above to obtain a battery pack of Example 1M.

Example 1N

A gypsum plate having a thickness of 1 mm was formed and bonded to the inner part of the spark trapping portion 1M. An arrangement position of the gypsum plate was on the wall facing the wall portion connected with the communication pipe 1N. A battery pack was manufactured similar to Example 1A except for the above to obtain a battery pack of Example 1N.

Example 2A

A porous ceramic plate (industrial ceramic honeycomb: manufactured by NGK Insulators, Ltd.) containing moisture and having a thickness of 1 mm was bonded to the inner part of the gas cooling portion 1L. An arrangement position of the porous ceramic plate was on a wall facing a wall portion connected with the main pipes 1I. A battery pack was manufactured similar to Example 1A except for the above to obtain a battery pack of Example 2A.

Example 2B

Glass wool containing moisture and having a thickness of 1 mm was bonded to the inner part of the gas cooling portion 1L. An arrangement position of the glass wool was on the wall facing the wall portion connected with the main pipes 1I. A battery pack was manufactured similar to Example 1A except for the above to obtain a battery pack of Example 2B.

Example 2C

Aqueous gel (heat buster manufactured by PDM Laboratory Co., Ltd.) was so applied to the inner part of the gas cooling portion 1 as to have a thickness of 1 mm. An application position of the aqueous gel was on the wall facing the wall portion connected with the main pipes 1I. A battery pack was manufactured similar to Example 1A except for the above to obtain a battery pack of Example 2C.

Example 2D

A copper plate having a thickness of 1 mm was bonded to the inner part of the gas cooling portion 1L. An arrangement position of the copper plate was on the wall facing the wall portion connected with the main pipes 1I. A battery pack was manufactured similar to Example 1A except for the above to obtain a battery pack of Example 2D.

Example 2E

An aluminum plate having a thickness of 1 mm was bonded to the inner part of the gas cooling portion 1L. An arrangement position of the aluminum plate was on the wall facing the wall portion connected with the main pipes 1I. A battery pack was manufactured similar to Example 1A except for the above to obtain a battery pack of Example 2E.

Example 2F

A SUS316 plate having a thickness of 1 mm was bonded to the inner part of the gas cooling portion 1L. An arrangement position of the SUS316 plate was on the wall facing the wall portion connected with the main pipes 1I. A battery pack was manufactured similar to Example 1A except for the above to obtain a battery pack of Example 2F.

Example 2G 90 weight parts of ammonium dihydrogenphosphate powder (manufactured by Kanto Chemical Co., Inc., special grade (G)) and 10 weight parts of PTFE powder were kneaded in a mortar to form pellets having a thickness of 1 mm. These pellets are bonded to the inner part of the gas cooling portion 1L. An arrangement position of these pellets was on the wall facing the wall portion connected with the main pipes 1I. A battery pack was manufactured similar to Example 1A except for the above to obtain a battery pack of Example 2G.

Example 2H 90 weight parts of sodium hydrogen carbonate and 10 weight parts of PTFE powder were kneaded in a mortar to form pellets having a thickness of 1 mm. These pellets are bonded to the inner part of the gas cooling portion 1L. An arrangement position of these pellets was on the wall facing the wall portion connected with the main pipes 1I. A battery pack was manufactured similar to Example 1A except for the above to obtain a battery pack of Example 2H.

Example 2I 90 weight parts of aluminum hydroxide (manufactured by Kanto Chemical Co., Inc., special grade (G)) and 10 weight parts of PTFE powder were kneaded in a mortar to form pellets having a thickness of 1 mm. These pellets are bonded to the inner part of the gas cooling portion 1L. An arrangement position of these pellets was on the wall facing the wall portion connected with the main pipes 1I. A battery pack was manufactured similar to Example 1A except for the above to obtain a battery pack of Example 2I.

Example 2J 90 weight parts of magnesium carbonate (manufactured by Kanto Chemical Co., Inc., special grade (G)) and 10 weight parts of PTFE powder were kneaded in a mortar to form pellets having a thickness of 1 mm. These pellets are bonded to the inner part of the gas cooling portion 1L. An arrangement position of these pellets was on the wall facing the wall portion connected with the main pipes 1I. A battery pack was manufactured similar to Example 1A except for the above to obtain a battery pack of Example 2J.

Example 2K 90 weight parts of copper (II) sulfate pentahydrate (manufactured by Kanto Chemical Co., Inc., special grade (G)) and 10 weight parts of PTFE powder were kneaded in a mortar to form pellets having a thickness of 1 mm. These pellets are bonded to the inner part of the gas cooling portion 1L. An arrangement position of these pellets was on the wall facing the wall portion connected with the main pipes 1I. A battery pack was manufactured similar to Example 1A except for the above to obtain a battery pack of Example 2K.

Example 2L 90 weight parts of calcium hydroxide (manufactured by Kanto Chemical Co., Inc., special grade (G)) and 10 weight parts of PTFE powder were kneaded in a mortar to form pellets having a thickness of 1 mm. These pellets are bonded to the inner part of the gas cooling portion 1L. An arrangement position of these pellets was on the wall facing the wall portion connected with the main pipes 1I. A battery pack was manufactured similar to Example 1A except for the above to obtain a battery pack of Example 2L.

Comparative Example 1

A battery pack was manufactured as Comparative Example 1 similar to Example 1A except that the exhaust duct 1C was eliminated.

Comparative Example 2

A battery pack was manufactured as Comparative Example 2 similar to Example 1A except that the exhaust duct 1C was eliminated and the casing dimension was shortened by 14.4 mm by narrowing cell intervals.

The following evaluations were conducted for the respective battery packs obtained in the above Examples and Comparative Examples.

(i) Nail Penetration Test

Ten completed battery packs were placed in an environmental temperature of 20° C. and a nail penetration test was conducted using an iron nail having a diameter of 2.5 mm. This nail penetration test was carried out by penetrating the nail at a speed of 5 mm/sec until the nail penetrates through a battery (cell) through a through hole formed in a battery pack lid beforehand for nail penetration. The battery pierced with the nail is one battery of the set located at a side opposite to the gas cooling portion in the battery pack. The nail was so pierced as to pass centers in a height direction and a diametrical direction of the battery. Sparks and flame released to the outside of the pack were observed using a high-speed camera. The presence of flame was judged when flame was continuously confirmed for 0.5 sec or longer and the presence of sparks was judged when sparks were confirmed at 10 or more points for 0.1 sec outside the pack. It should be noted that the nail pierced part was formed such that gas, sparks and flame do no leak from this part via a heat resistance seal member.

Evaluation Result is shown in TABLE-1.

TABLE 1

|  | Between Cells | Spark Trap | Gas Cooling Portion | Sparks to Outside | Flame to Outside |
|---|---|---|---|---|---|
| Example 1A | Exhaust Duct | NO | NO | YES | NO |
| Example 1B | Exhaust Duct | Porous Ceramic Plate | NO | NO | NO |
| Example 1C | Exhaust Duct | Gel Sheet | NO | NO | NO |
| Example 1D | Exhaust Duct | Copper Mesh | NO | NO | NO |
| Example 1E | Exhaust Duct | Aluminum Mesh | NO | NO | NO |
| Example 1F | Exhaust Duct | SUS Mesh | NO | NO | NO |
| Example 1M | Exhaust Duct | Cement | NO | NO | NO |
| Example 1N | Exhaust Duct | Gypsum | NO | NO | NO |
| Example 2A | Exhaust Duct | NO | Aqueous Ceramic Plate | YES | NO |
| Example 2B | Exhaust Duct | NO | Aqueous Glass Wool | NO | NO |
| Example 2C | Exhaust Duct | NO | Aqueous Gel | NO | NO |
| Example 2D | Exhaust Duct | NO | Copper Plate | NO | NO |
| Example 2E | Exhaust Duct | NO | Aluminum Plate | NO | NO |
| Example 2F | Exhaust Duct | NO | SUS Plate | NO | NO |
| Example 2G | Exhaust Duct | NO | $NH_4H_2PO_4$ | NO | NO |
| Example 2H | Exhaust Duct | NO | Sodium Hydrogen Carbonate | NO | NO |
| Example 2I | Exhaust Duct | NO | Aluminum Hydroxide | NO | NO |
| Example 2J | Exhaust Duct | NO | Magnesium Carbonate | NO | NO |
| Example 2K | Exhaust Duct | NO | Copper Sulfate Hydrate | NO | NO |
| Example 2L | Exhaust Duct | NO | Calcium hydroxide | NO | NO |
| Comp. Example 1 | Clearance | NO | NO | YES | YES |
| Comp. Example 2 | NO Clearance | NO | NO | YES | YES |

As shown in TABLE-1, in Comparative Examples 1 and 2, the release of sparks and flames from various areas of the battery pack and then spread burning to the cells other than the ignited and nail pieced one in the battery pack were confirmed. This is because high-temperature gas released form the nail pierced cell was mixed with the air to start burning while being kept at high temperature since no flow path was restricted in the battery pack. In contrast, the reason why ignition outside the pack after the passage of the exhaust duct could be suppressed in Example 1A is thought to be that a considerable number of sparks could be removed in the bent portions of the exhaust duct and, in addition, the temperature of the gas fell to or below a spontaneous ignition temperature by having heat deprived by the wall surface of the exhaust duct. Specifically, it is thought that the ignition of the gas and the spread burning of the pack and the other cells could be suppressed by reducing sparks and the gas temperature as the causes of ignition before the gas is moderately mixed with the air to ignite. Further, since the gas flows at a gas flow velocity of a specified value or higher in the exhaust duct, the contact of the gas with oxygen in the air in the exhaust duct is suppressed to suppress burning in the exhaust duct. Upon actually analyzing components of the generated gas, oxidation gases, mostly by carbon dioxide, were main components and reducing gas of hydrogen carbonate generated by thermal decomposition was hardly confirmed in Comparative Examples 1 and 2, whereby it was understood that burning was completely progressing. In contrast, in Example 1A, it was confirmed that a ratio of oxidation gases decreased and a ratio of the reducing gas released without being burnt was drastically increased.

In Examples 1B to 1N, effects brought about by providing the spark trap on the wall surface of the spark trapping portion 1M that the high-temperature gas touches. In this way, it could be confirmed that the amount of sparks released to the outside of the pack could be substantially zeroed as compared with Example 1A having no spark trap and there was a remarkable effect of suppressing the ignition of the gas.

In Examples 2A to 2L, the temperature of the gas was reduced to suppress the ignition of the gas by arranging an endothermic material for depriving heat by a high thermal capacity, thermal decomposition or vaporization or a material with good thermal conductivity such as a metal in the high-temperature gas flow path. The material for generating the gas needs to be the one for generating inert gas. A spark reduction was also confirmed by arranging these materials.

By reducing the temperature of the gas released from the interior of the battery and releasing the gas to the outside of the pack, a safe battery pack free from gas burning, damage of the battery pack and spread burning to other batteries can be realized.

Next, examples of the battery-mounted device are described.

(1) Manufacturing of Positive Electrode Plate

Sulfate salts of Co and Al were added at a specified ratio to a $NiSO_4$ aqueous solution to prepare a saturated aqueous solution. While this saturated aqueous solution was stirred, a sodium hydroxide solution was slowly dripped to this saturated aqueous solution. In this way, the saturated aqueous solution was neutralized, with the result that ternary nickel hydroxide $Ni_{0.7}Co_{0.2}Al_{0.1}(OH)_2$ precipitate could be produced (coprecipitation method). After being filtered, the produced precipitate was washed with water and dried at 80° C. An average particle diameter of the obtained nickel hydroxide was about 10 μm.

A heat treatment was carried out for 10 hours at 900° C. in the air to the obtained $Ni_{0.7}Co_{0.2}Al_{0.1}(OH)_2$ to obtain nickel oxide $Ni_{0.7}Co_{0.2}Al_{0.1}O$. At this time, the obtained nickel oxide $Ni_{0.7}Co_{0.2}Al_{0.1}O$ was diffracted using a powder X-ray diffraction method to confirm that nickel oxide $Ni_{0.7}Co_{0.2}Al_{0.1}O$ was nickel oxide with a single phase. Lithium hydroxide monohydrate is added to nickel oxide $Ni_{0.7}Co_{0.2}Al_{0.1}O$ so that the sum of the atomic numbers of Ni, Co and Al is equal to the atomic number of Li and a heat treatment was carried out for 10 hours at 800° C. in the dry air to the obtained mixture, whereby lithium-nickel composite oxide $LiNi_{0.7}Co_{0.2}Al_{0.1}O_2$ was obtained.

When the obtained lithium-nickel composite oxide $LiNi_{0.7}Co_{0.2}Al_{0.1}O_2$ was diffracted using the powder X-ray diffraction method, it was confirmed that this lithium-nickel composite oxide $LiNi_{0.7}Co_{0.2}Al_{0.1}O_2$ had a hexagonal layered structure with a single phase and Co and Al were solid solved in this lithium-nickel composite oxide. After being crushed, the lithium-nickel composite oxide was classified and powdered. An average particle diameter of this powder was 9.5 μm and a specific surface area thereof obtained according to a BET method was 0.4 $m^2/g$.

3 kg of the obtained lithium-nickel composite oxide, 90 g of acetylene black and 1 kg of PVDF solution were kneaded in a planetary mixer together with a suitable amount of N-methylpyrrolidone (NMP) to prepare a slurry positive electrode mixture. This positive electrode mixture is applied to an aluminum foil having a thickness of 20 μm and a width of 150 mm. At this time, an unapplied portion having a width of 5 mm was formed at one widthwise end of the aluminum foil. Thereafter, the positive electrode mixture was dried to form a positive electrode mixture layer on the aluminum foil. After pressing is applied such that the total thickness of the positive electrode mixture layer and the aluminum foil was 100 μm, a positive electrode plate A for a cylindrical lithium ion secondary battery of 18650 size and a positive electrode plate B for a battery with a tabless current collecting structure were formed. An electrode plate for the battery with the tabless current collecting structure had a width of 105 mm and was cut such that the width of a mixture applied portion became 100 mm to manufacture the positive electrode plate B of the tabless current structure.

(2) Manufacturing of Negative Electrode Plate

Specifically, 3 kg of artificial graphite, 75 g of rubber particle (binder) aqueous solution (containing 40% of part weight of solid content) made of styrene-butadiene copolymer and 30 g of carboxymethylcellulose (CMC) were kneaded in a planetary mixer together with a suitable amount of water to prepare a slurry negative electrode mixture. This negative electrode mixture is applied to a copper foil having a thickness of 10 μm and a width of 150 mm. At this time, an unapplied portion (exposed portion) having a width of 5 mm was formed at one widthwise end of the copper foil. Thereafter, the negative electrode mixture was dried to form a negative electrode mixture layer on the copper foil. After pressing is applied such that the total thickness of the negative electrode mixture layer and the copper foil was 110 μm, a negative electrode plate A for the cylindrical lithium ion secondary battery of 18650 size and a negative electrode plate B for the battery with the tabless current collecting structure were formed. An electrode plate for the battery with the tabless current collecting structure had a width of 110 mm and was cut such that the width of a mixture applied portion became 105 mm to manufacture the negative electrode plate of the tabless current structure.

(3) Manufacturing of Cylindrical Sealed Battery of 18650 Size

A cylindrical sealed battery A of 18650 size having a nominal capacity of 2.4 was manufactured by a method similar to the one in Example 1A except that the positive electrode plate A and the negative electrode plate A were used.

(4) Manufacturing of Sealed Battery with Tabless Current Collecting Structure

A separator made of polyethylene was held between the manufactured positive electrode and negative electrode and the exposed portion of the positive electrode and that of the negative electrode were caused to project in opposite directions from end surfaces of the separator. Thereafter, the positive electrode, the negative electrode and the separator were wound into a cylindrical shape.

Subsequently, reinforcing members were formed on the exposed portions.

Specifically, EC as a solvent of a nonaqueous electrolytic solution was heated to 50° C. to melt, thereby obtaining liquid EC. A 10 mm part of the exposed portion of the positive electrode from the end surface of the exposed portion was immersed in the liquid EC. Thereafter, the liquid EC was solidified by being left at room temperature. Similarly, a 10 mm part of the exposed portion of the negative electrode from the end surface of the exposed portion was immersed in the liquid EC. Thereafter, the liquid EC was solidified by being left at room temperature. In this way, the reinforcing members are formed on the exposed portions of the positive and negative electrodes, whereby an electrode group could be formed.

Thereafter, the current collecting structure was formed.

Specifically, an aluminum current collecting plate was pressed against the end surface of the exposed portion of the positive electrode and laser was irradiated in a crisscrossed manner. In this way, the aluminum current collecting plate can be bonded to the end surface of the exposed portion of the positive electrode.

Further, a circular portion of a nickel current collecting plate was pressed against the end surface of the exposed portion of the negative electrode and laser is irradiated in a crisscrossed manner. In this way, the nickel current collecting plate can be bonded to the end surface of the exposed portion of the negative electrode, whereby the current collecting structure was formed.

The formed current collecting structure was inserted into a nickel-plated iron cylindrical casing. Thereafter, tab portions of the nickel current collecting plate were bent and resistance welded to the bottom of the casing. Further, tab portions of the aluminum current collecting plate were laser welded to a sealing plate and a nonaqueous electrolytic solution was poured into the casing. At this time, the nonaqueous electrolytic solution was prepared by dissolving lithium hexafluorophosphate ($LiPF_6$) as a solute at a concentration of 1 mol/ $dm^3$ into a mixture solvent obtained by mixing EC and ethylmethyl carbonate (EMC) at a volume ratio of 1:3. Thereafter, the sealing plate is caulked to seal the casing. In this way, a sealed battery B with the tabless current collecting structure having a nominal capacity of 5 Ah was manufactured.

Example 3A

A note PC as a battery-mounted device as shown in FIGS. 5 and 6 was prepared using cylindrical sealed batteries A of 18650 size. Specifically, a battery pack 10 including an exhaust duct (connection pipes 10H, main pipes 10I and connecting portion 10P) and a commercially available note PC including the later-formed external path (gas cooling portion 10L, communication path 10Z, spark trapping portion 10M and exhaust port 10Y) were prepared. A copper plate having a thickness of 1 mm was bonded to the inner part of the gas cooling portion 10L. An arrangement position of the copper plate was on a surface facing a wall portion connected with the main pipes 10I. A porous ceramic plate (industrial ceramic honeycomb; manufactured by NGK Insulators, Ltd.) having a thickness of 1 mm was bonded to the inner part of the spark trapping portion 10M. An arrangement position of this porous ceramic plate was on a wall facing a wall portion connected with the communication pipe 10Z. The note PC thus manufactured was a battery-mounted device of Example 3A.

Example 3B)

An electric bicycle 14 as a battery-mounted device as shown in FIGS. 7 to 9 was prepared using sealed batteries B with a tabless current collecting structure. Specifically, a battery pack 12 including an exhaust duct (connection pipes 12H, gas cooling portion 12L and connecting portion 12P) and a commercially available electric bicycle including a later-formed external path (spark trapping portion 12M and exhaust port 12Y) were prepared. A copper plate having a thickness of 1 mm was bonded to the inner part of the gas cooling portion 12L. An arrangement position of the copper plate was on a surface facing a wall portion connected with the connection pipes 12H. A porous ceramic plate (industrial ceramic honeycomb; manufactured by NGK Insulators, Ltd.) having a thickness of 1 mm was bonded to the inner part of the spark trapping portion 12M. An arrangement position of this porous ceramic plate was on a wall facing a wall portion connected with the connecting portion 12P. The electric bicycle 12 thus manufactured was a battery-mounted device of Example 3B.

Example 3C

A hybrid electric car as a battery-mounted device as shown in FIGS. 10 to 12 was prepared using sealed batteries B with a tabless current collecting structure. Specifically, a battery pack 15 including an exhaust duct (pack main body 15A, outlet pipes 15B, collecting pipe 15C and connecting portion 15P) and a commercially available hybrid electric car including a later-formed external path (gas cooling portion 16A, spark trapping portion 16B and exhaust pipe 16C) were prepared. A copper plate having a thickness of 1 mm was bonded to the inner part of the gas cooling portion 16A. An arrangement position of the copper plate was on a surface facing a wall portion connected with the connecting portion 15D. A porous ceramic plate (industrial ceramic honeycomb; manufactured by NGK Insulators, Ltd.) having a thickness of 1 mm was bonded to the inner part of the spark trapping portion 16B. An arrangement position of this porous ceramic plate was on a wall facing a wall portion connected with the gas cooling portion 16A. The hybrid electric car thus manufactured was a battery-mounted device of Example 3C.

Comparative Example 3

A battery pack including no exhaust duct (connection pipes 10H, main pipes 10I and connecting portion 10P) and a commercially available note PC including a later-formed external path (gas cooling portion 10L, communication path 10Z, spark trapping portion 10M and exhaust port 10Y) were prepared to build a battery-mounted device of Comparative Example 3.

Comparative Example 4

A battery pack including no exhaust duct (connection pipes 12H, gas cooling portion 12L and connecting portion 12P) and a commercially available electric bicycle including a later-formed external path (spark trapping portion 12M and exhaust port 12Y) were prepared to build a battery-mounted device of Comparative Example 4.

Comparative Example 5

A battery pack including no exhaust duct (outlet pipes 15B, collecting pipe 15C and connecting portion 15P) and a commercially available electric car including a later-formed external path (gas cooling portion 16L, spark trapping portion 16B and exhaust pipe 16C) were prepared to build a battery-mounted device of Comparative Example 5.

The following evaluations were conducted for the respective battery packs obtained in the above Examples and Comparative Examples.

(i) Nail Penetration Test

The completed battery-mounted device was placed in an environmental temperature of 20° C. and the battery pack was charged with constant current, constant voltage up to 4.5 V by bypassing an overcharge protection circuit and a current interrupt device (CID) of the cells of the pack normally charged up to 4.2 V with a maximum current per cell at the time of charging set to 0.7 It (1 It is 5 A when a battery capacity is 5 Ah) and a current at the end of charging set to 0.05 It. Thereafter, a test and an evaluation were conducted in a manner similar to the nail penetration test described above.

In Comparative Examples 3, 4 and 5, it was confirmed that sparks and flames were released from various areas of the battery pack and, thereafter, the casing of the battery pack and the battery-mounted device are ignited and the cells in the pack, which were not pierced with the nail, caught fire. This is because the high-temperature gas containing sparks released from the nail pierced cell was mixed with the air to start burning while being kept at high temperature since the flow path was not restricted in the battery pack. In contrast, in Examples 3A, 3B and 3C, neither sparks nor flames were observed except that white smoke from a gas exhausting portion of the battery-mounted device was observed and no spread burning to the cells in the pack, which were not nail pierced, the casing of the pack and the battery-mounted device was observed at all.

The spread burning to the cells other than the nail pierced one could be suppressed because of an effect of suppressing the mixing of the air and the gas by the exhaust duct or the external path and an effect of suppressing the ignition of the gas released to the outside by the gas cooling portion and the spark trapping portion.

As shown in Examples 3A, 3B and 3C, the gas cooling portion and the spark trapping portion provide similar effects regardless of whether they are mounted in the battery pack or the battery-mounted device main body. In the case of reducing the weight and size of the battery pack, it is preferable to form the gas cooling portion and the spark trapping portion in the battery-mounted device main body.

A safe battery-mounted device free from the burning of the gas, the damage of the battery pack and the spread burning to the other batteries can be realized by reducing the temperature of the high-temperature gas released from the interior of the battery and releasing the gas to the outside of the battery-mounted device in this way.

Further, a duct having a connecting portion as shown in FIGS. 13 to 17 and batteries were manufactured using cylindrical lithium ion secondary batteries having a diameter of 32 mm and a height of 120 mm, which are sealed batteries with a tabless current collecting structure having the same design as the batteries used in Examples 3B and 3C, and a gas cooling portion and a spark trapping portion similar to those used in Example 3B were connected.

When evaluation was conducted by a method similar to the above nail penetration test using these, an effect of suppressing sparks and flames from the gas releasing portion was similarly confirmed. No leakage of sparks and flames from the connecting portion was also confirmed. It was confirmed that installation and manufacturing became easier without adversely affecting safety by connecting the batteries and the duct by the detachable connecting member in this way.

In other words, the present invention according to the above embodiments is directed to a battery pack containing a battery in a casing, comprising a path for permitting the flow of gas released from the battery, the path being capable of exhausting the gas to the outside after reducing the temperature of the gas in the path.

Since the temperature of the gas is reduced to such a temperature as not to lead to a burning state before the gas is exhausted to the outside in the present invention, the burning of the gas exhausted to the outside can be suppressed.

It is preferable to provide a duct as the path. In this mode, the flow path of the gas can be restricted by the duct. Thus, the mixing of the gas and oxygen can be suppressed and transition to a burning state before the gas temperature is reduced can be effectively prevented.

The present invention is also directed to a battery pack containing a battery in a casing, comprising a path for permitting the flow of gas released from the battery, wherein the path is capable of permitting the flow of the gas such that a flow velocity of the gas does not fall to or below a certain value.

Since the gas flows without the gas flow velocity falling to or below the specified value in the present invention, the contact of the gas and oxygen in a main pipe can be suppressed. Thus, the burning of the gas can be suppressed even if the gas has high temperature.

Here, it is preferable to provide a duct as the path. In this mode, the flow path of the gas can be restricted. Thus, the mixing of the gas and oxygen can be suppressed and transition of the gas to a burning state before the gas temperature is reduced can be effectively prevented.

The path preferably includes a bent portion for bending a flowing direction of the gas. In this mode, if sparks are generated from the gas, the gas flow direction and a spark belching direction can be separated in the bent portion. As a result, the flow of the gas with sparks can be suppressed and the burning of the gas can be suppressed.

A horizontal cross-sectional area of the path is preferably in the range of not less than 0.5 $mm^2$ and not more than 15 $mm^2$ per 1 Ah of the capacity of the battery having a gas releasing portion communicating with the path. In this mode, the contact of the gas with oxygen in the air in the path is suppressed to suppress the burning in the path.

The path preferably includes heat exchange means or endothermic means for reducing the temperature of the gas. In this mode, the gas temperature can be efficiently reduced up to such a temperature at which the gas is not burnt.

The path preferably includes means for trapping sparks generated in the gas. In this mode, the burning of the gas can be reliably prevented by removing sparks that will cause ignition.

The path is preferably connected with gas releasing portions of the respective batteries in such a manner that gas from a plurality of batteries can flow into the path. In this mode, even if gas is released from one battery, the burning of the gas is suppressed, whereby a situation where the other batteries are exposed to high temperature to catch fire can be avoided.

The present invention is also directed to a battery-mounted device containing a battery in a casing and exhibiting a specified function by the power of the battery, comprising a path for permitting the flow of gas released from the battery, the path being capable of exhausting the gas to the outside after reducing the temperature of the gas in the path.

In this battery-mounted device, it is preferable to provide a duct as the path.

The present invention is also directed to a battery-mounted device containing a battery in a casing and exhibiting a specified function by the power of the battery, comprising a path for permitting the flow of gas released from the battery, wherein the path is capable of permitting the flow of the gas such that a flow velocity of the gas does not fall to or below a certain value.

In this battery-mounted device, it is preferable to provide a duct as the path.

In the above battery-mounted device, the path preferably includes a bent portion for bending a flowing direction of the gas.

In the above battery-mounted device, a horizontal cross-sectional area of the path is preferably in the range of not less than 0.5 $mm^2$ and not more than 15 $mm^2$ per 1 Ah of the capacity of the battery having a gas releasing portion communicating with the path.

In the above battery-mounted device, the path preferably includes heat exchange means or endothermic means for reducing the temperature of the gas.

In the above battery-mounted device, the path preferably includes means for trapping sparks generated in the gas.

In the above battery-mounted device, a connecting portion for attaching and detaching the battery or a battery pack to or from the battery-mounted device is preferably present in the path.

In the above battery-mounted device, the path is preferably connected with gas releasing portions of the respective batteries in such a manner that gas from a plurality of battery packs can flow into the path.

The present invention is further directed to a battery pack connecting structure, comprising a battery pack and an external path provided in a battery-mounted device to have the battery pack mounted therein and capable of communicating with the path of the battery pack, wherein an exhaust port of the external path is arranged in a surface of the battery-mounted device different from a side surface facing a user.

In the above battery-mounted device, an exhaust port for releasing the gas to the outside is preferably arranged in a surface different from a side surface of an electronic-mounted device facing the user.

In the battery pack or the battery-mounted device, the battery and the path are preferably detachably attachable to each other.

INDUSTRIAL APPLICABILITY

A battery pack of the present invention is free from the damage and spread burning of the battery pack and the release of flame to the outside of the battery pack even if abnormality occurs in a battery in the battery pack and high-temperature gas is released from the battery. Thus, a battery pack with good safety can be provided.

What is claimed is:

1. A battery pack containing a battery in a casing, comprising a path for permitting the flow of gas released from the battery, the path being capable of exhausting the gas to the outside after reducing the temperature of the gas in the path, wherein a horizontal cross-sectional area of the path is in the range of not less than 0.5 mm$^2$ and not more than 15 mm$^2$ per 1 Ah of the capacity of the battery having a gas releasing portion communicating with the path.

2. A battery pack according to claim 1, wherein a duct is provided as the path.

3. A battery pack containing a battery in a casing, comprising a path for permitting the flow of gas released from the battery, wherein the path is capable of permitting the flow of the gas such that a flow velocity of the gas does not fall to or below a certain value, wherein a horizontal cross-sectional area of the path is in the range of not less than 0.5 mm$^2$ and not more than 15 mm$^2$ per 1 Ah of the capacity of the battery having a gas releasing portion communicating with the path.

4. A battery pack according to claim 3, wherein a duct is provided as the path.

5. A battery pack according to claim 3, wherein the path includes a bent portion for bending a flowing direction of the gas.

6. A battery pack according to claim 1, wherein the path includes heat exchange means or endothermic means for reducing the temperature of the gas.

7. A battery pack according to claim 1, wherein the path includes means for trapping sparks generated in the gas.

8. A battery pack according to claim 1, wherein the path is connected with gas releasing portions of the respective batteries in such a manner that gas from a plurality of batteries can flow into the path.

9. A battery-mounted device containing a battery in a casing and exhibiting a specified function by the power of the battery, comprising a path for permitting the flow of gas released from the battery, the path being capable of exhausting the gas to the outside after reducing the temperature of the gas in the path, wherein a horizontal cross-sectional area of the path is in the range of not less than 0.5 mm$^2$ and not more than 15 mm$^2$ per 1 Ah of the capacity of the battery having a gas releasing portion communicating with the path.

10. A battery-mounted device according to claim 9, wherein a duct is provided as the path.

11. A battery-mounted device containing a battery in a casing and exhibiting a specified function by the power of the battery, comprising a path for permitting the flow of gas released from the battery, wherein the path is capable of permitting the flow of the gas such that a flow velocity of the gas does not fall to or below a certain value, wherein a horizontal cross-sectional area of the path is in the range of not less than 0.5 mm$^2$ and not more than 15 mm$^2$ per 1 Ah of the capacity of the battery having a gas releasing portion communicating with the path.

12. A battery-mounted device according to claim 11, wherein a duct is provided as the path.

13. A battery-mounted device according to claim 11, wherein the path includes a bent portion for bending a flowing direction of the gas.

14. A battery-mounted device according to claim 9, wherein the path includes heat exchange means or endothermic means for reducing the temperature of the gas.

15. A battery-mounted device according to claim 9, wherein the path includes means for trapping sparks generated in the gas.

16. A battery-mounted device according to claim 9, wherein a connecting portion for attaching and detaching the battery or a battery pack to or from the battery-mounted device is provided in the path.

17. A battery-mounted device according to claim 9, wherein the path is connected with gas releasing portions of the respective batteries in such a manner that gas from a plurality of battery packs can flow into the path.

18. A battery pack connecting structure, comprising a battery pack according to claim 1 and an external path provided in a battery-mounted device to have the battery pack mounted therein and capable of communicating with the path of the battery pack, wherein an exhaust port of the external path is arranged in a surface of the battery-mounted device different from a side surface facing a user.

19. A battery-mounted device according to claim 9, wherein an exhaust port for releasing the gas to the outside is arranged in a surface different from a side surface of an electronic-mounted device facing the user.

20. A battery pack according to claim 1, wherein the battery and the path are detachably attachable to each other.

21. A battery-mounted device according to claim 9, wherein the battery and the path are detachably attachable to each other.

* * * * *